United States Patent
Kato et al.

(10) Patent No.: US 10,674,491 B2
(45) Date of Patent: *Jun. 2, 2020

(54) MOBILE STATION APPARATUS, METHOD, AND PROCESSOR OF THE SAME CONFIGURING MULTIPLE TIMERS RELATED TO MULTIPLE CELL GROUPS ASSOCIATED WITH HARQ BUFFERS

(71) Applicant: Sharp Kabushiki Kaisha, Sakai, Osaka (JP)

(72) Inventors: Yasuyuki Kato, Sakai (JP); Katsunari Uemura, Sakai (JP); Daiichiro Nakashima, Sakai (JP); Shoichi Suzuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,369

(22) Filed: Dec. 6, 2018

(65) Prior Publication Data

US 2019/0110289 A1   Apr. 11, 2019

Related U.S. Application Data

(63) Continuation of application No. 15/636,803, filed on Jun. 29, 2017, now Pat. No. 10,194,429, which is a
(Continued)

(30) Foreign Application Priority Data

Dec. 17, 2010   (JP) ................................. 2010-281681

(51) Int. Cl.
*H04W 72/04*  (2009.01)
*H04W 56/00*  (2009.01)
*H04W 74/08*  (2009.01)

(52) U.S. Cl.
CPC .... *H04W 72/0413* (2013.01); *H04W 56/0005* (2013.01); *H04W 72/0446* (2013.01); *H04W 74/0833* (2013.01)

(58) Field of Classification Search
CPC ............... H04W 72/042; H04W 72/14; H04W 56/0045; H04W 72/1284; H04W 48/16;
(Continued)

(56) References Cited

U.S. PATENT DOCUMENTS

| 8,312,336 B2 * | 11/2012 | Chun | ................... H04L 1/1822 714/748 |
| 2009/0204862 A1 * | 8/2009 | Chun | ................... H04L 1/1822 714/748 |

(Continued)

OTHER PUBLICATIONS

Kato et al., "A Mobile Station Apparatus That Controls an Uplink Transmission, and a Method for Controlling an Uplink Transmission", U.S. Appl. No. 15/636,803, filed Jun. 29, 2017.

*Primary Examiner* — Sai Aung
(74) *Attorney, Agent, or Firm* — Keating & Bennett, LLP

(57) ABSTRACT

A mobile station apparatus configures first and second timers related to first and second groups. A first group of cells uses a first uplink transmission timing, and a second group of secondary cells uses a second uplink transmission timing. When the first timer of the first group has expired: all transmission HARQ buffers in association with the cells of the first group are flushed, the second timer is considered as expired, and an uplink transmission on any cells except random access preamble transmission on the primary cell is stopped. In a case where the second timer of the second group has expired: all transmission HARQ buffers in association with the secondary cells of the second group are flushed, and an uplink transmission on any cells in the second group except random access preamble transmission on the any cells in the second group is stopped.

2 Claims, 12 Drawing Sheets

Related U.S. Application Data continuation of application No. 14/950,287, filed on Nov. 24, 2015, now Pat. No. 9,872,281, which is a continuation of application No. 13/994,279, filed as application No. PCT/JP2011/078892 on Dec. 14, 2011, now Pat. No. 9,258,804.

(58) Field of Classification Search
CPC ............. H04W 72/04; H04W 72/0413; H04W 74/0833; H04L 1/1864; H04L 5/0053; H04L 1/1822; H04L 1/1887; H04L 1/1671; H04L 1/1835; H04L 1/1874; H04L 1/1812; H04L 1/1829
See application file for complete search history.

(56) References Cited

U.S. PATENT DOCUMENTS

| | | | | |
|---|---|---|---|---|
| 2009/0245203 A1* | 10/2009 | Pani | ...................... | H04W 36/30 370/331 |
| 2009/0259910 A1* | 10/2009 | Lee | ........................ | H04L 1/1877 714/748 |
| 2009/0279495 A1* | 11/2009 | Yoo | ........................ | H04L 5/0078 370/329 |
| 2009/0300457 A1* | 12/2009 | Kuo | ........................ | H04W 76/38 714/749 |
| 2010/0074230 A1* | 3/2010 | Ishii | .................. | H04W 72/1252 370/336 |
| 2010/0265896 A1* | 10/2010 | Park | .................. | H04W 72/0413 370/329 |
| 2010/0325502 A1* | 12/2010 | Lindskog | .............. | H04L 1/1657 714/748 |
| 2011/0243102 A1* | 10/2011 | Sebire | ................ | H04W 56/0045 370/336 |
| 2012/0269137 A1* | 10/2012 | Kang | ................... | H04B 7/0404 370/329 |
| 2013/0010619 A1* | 1/2013 | Fong | ................... | H04W 74/002 370/252 |

* cited by examiner

MOBILE STATION APPARATUS, METHOD, AND PROCESSOR OF THE SAME CONFIGURING MULTIPLE TIMERS RELATED TO MULTIPLE CELL GROUPS ASSOCIATED WITH HARQ BUFFERS

TECHNICAL FIELD

The present invention relates to mobile station apparatuses, base station apparatuses, and wireless communication systems and, more particularly, to a mobile station apparatus, a base station apparatus, a wireless communication system, a control method, and an integrated circuit for performing an operation in a case where the uplink transmission timing becomes invalid.

BACKGROUND ART

W-CDMA has been standardized as a third generation cellular mobile communication scheme by 3GPP (3rd Generation Partnership Project), and services based thereon have been sequentially launched. Also, HSDPA with higher communication speed has been standardized, and services based thereon have been launched.

Also, in 3GPP, standardization of evolved third generation radio access (Evolved Universal Terrestrial Radio Access, hereinafter referred to as "EUTRA") is progressing. As a downlink communication scheme of EUTRA, OFDM (Orthogonal Frequency Division Multiplexing) is employed which is robust against multipath interference and is suitable for high-speed transmission. As an uplink communication scheme of EUTRA, DFT (Discrete Fourier Transform)-spread OFDM, which is SC-FDMA (Single Carrier-Frequency Division Multiple Access) and which can reduce the PAPR (Peak to Average Power Ratio) of a transmit signal, is employed while taking cost and power consumption of mobile station apparatuses into consideration.

Moreover, in 3GPP, discussions over Advanced-EUTRA which is further advancements for EUTRA have begun. Advanced-EUTRA assumes communications at a downlink peak transmission rate of 1 Gbps or higher and at an uplink peak transmission rate of 500 Mbps or higher by using a band having a bandwidth of up to 100 MHz in each of the uplink and the downlink.

It is conceived that a band of up to 100 MHz is realized in Advanced-EUTRA by aggregating a plurality of EUTRA bands, each of which has a bandwidth of 20 MHz or less, in order to support EUTRA mobile station apparatuses. In Advanced-EUTRA, each EUTRA band of 20 MHz or less is called a "component carrier (CC)" (NPL 2 described below). One downlink component carrier and one uplink component carrier constitute one cell. Note that one downlink component carrier alone can constitute one cell. The base station apparatus assigns a plurality of cells to each mobile station apparatus and performs communication with the mobile station apparatus via the assigned cells.

CITATION LIST

Non Patent Literature

NPL 1: 3GPP TS (Technical Specification) 36.300, V9.40 (2010-06), Evolved Universal Terrestrial Radio Access (E-UTRA) and Evolved Universal Terrestrial Radio Access Network (E-UTRAN), Overall description Stage 2

NPL 2: 3GPP TR (Technical Report) 36.814, V9.00 (2010-03), Evolved Universal Terrestrial Radio Access (E-UTRA) Further advancements for E-UTRA physical layer aspects

SUMMARY OF INVENTION

Technical Problem

In a case where a mobile station apparatus performs communication with a base station apparatus by using a plurality of cells, the mobile station apparatus sometimes accesses the base station apparatus via a repeater or the like. In such a case, the reception timing at which the mobile station apparatus receives data on the downlink component carrier differs from one cell to another. Furthermore, the transmission timing at which the mobile station apparatus performs transmission to the base station apparatus differs from one uplink component carrier of one cell to another uplink component carrier of another cell. For this reason, the mobile station apparatus is required to adjust the transmission timing for the uplink component carrier of each cell or for each group of component carriers having an identical transmission timing before transmitting data to the base station apparatus.

Because the mobile station apparatus is required to adjust the transmission timing for the uplink component carrier of each cell or for each group of component carriers having an identical transmission timing, the mobile station apparatus is required to have transmission timing timers, each of which indicates a transmission timing valid period and each of which is for the uplink component carrier of a corresponding cell or for a corresponding group of component carriers having an identical transmission timing.

Because the mobile station apparatus adjusts the transmission timing for the uplink component carrier of each cell, the transmission timing is possibly updated or possibly becomes invalid on a cell-by-cell basis. Accordingly, an efficient operation performed by the mobile station apparatus in a case where the transmission timing is updated or becomes invalid needs to be considered.

The present invention has been made in view of such circumstances, and aims to provide a mobile station apparatus, a base station apparatus, a wireless communication system, a control method, and an integrated circuit that efficiently control transmissions by the mobile station apparatus in a case where the transmission timing at which the mobile station apparatus transmits data differs from one uplink component carrier to another.

Solution to Problem (1) To this end, an embodiment of the present invention has taken the following measures. Specifically, a mobile station apparatus of an embodiment of the present invention is a mobile station apparatus that includes a memory and a processor in electrical communication with the memory, the processor executing instructions stored in the memory to: configure a first timer related to a first group and a second timer related to a second group, wherein a first group of one or more cells uses a first uplink transmission timing, the one or more cells includes a primary cell and zero or more secondary cells, and a second group of one or more secondary cells uses a second uplink transmission timing. In a case where the first timer of the first group has expired: all transmission HARQ buffers in association with the one or more cells of the first group are flushed, the second timer is considered expired, and an uplink transmission on any cells except random access preamble transmission on the primary cell is stopped. In a case where the second timer of the second group has expired: all transmission HARQ buffers in association with the one or more secondary cells of the second group are flushed, and an uplink transmission on any cells in the second group except random access preamble transmission on the any cells in the second group is stopped.

(2) In addition, a method of a mobile station apparatus of an embodiment of the present invention is a method which includes configuring a first timer related to a first group and a second timer related to a second group, wherein a first group of one or more cells uses a first uplink transmission timing, the one or more cells includes a primary cell and zero or more secondary cells, and a second group of one or more secondary cells uses a second uplink transmission timing. In a case where the first timer of the first group has expired: all transmission HARQ buffers in association with the one or more cells of the first group are flushed, the second timer is considered to be expired, and an uplink transmission on any cells except random access preamble transmission on the primary cell is stopped. In a case where the second timer of the second group has expired: all transmission HARQ buffers in association with the one or more secondary cells of the second group are flushed, and an uplink transmission on any cells in the second group except random access preamble transmission on the any cells in the second group are stopped.

Advantageous Effects of Invention

According to the present invention, a plurality of cells are assigned to one mobile station apparatus. The uplink transmission timing differs from one cell to another. In a case where a transmission timing timer for a corresponding one of transmission timing cell groups has expired, the mobile station apparatus stops transmission processing in corresponding cells in accordance with the transmission timing cell group for which the transmission timing timer has expired, so as not to perform an unnecessary operation for the transmission processing. In this way, transmission by the mobile station device can be efficiently controlled.

DESCRIPTION OF EMBODIMENTS

Downlink of EUTRA is constituted by a downlink reference signal (downlink pilot signal), a downlink synchronization channel DSCH, a physical downlink shared channel PDSCH, a physical downlink control channel PDCCH, and a physical broadcast channel PBCH.

Uplink of EUTRA is constituted by an uplink reference signal (uplink pilot signal), a random access channel RACH, a physical uplink shared channel PUSCH, and a physical uplink control channel PUCCH. Also, there are two kinds of uplink reference signal: a demodulation reference signal and a sounding reference signal.

Figure 6:
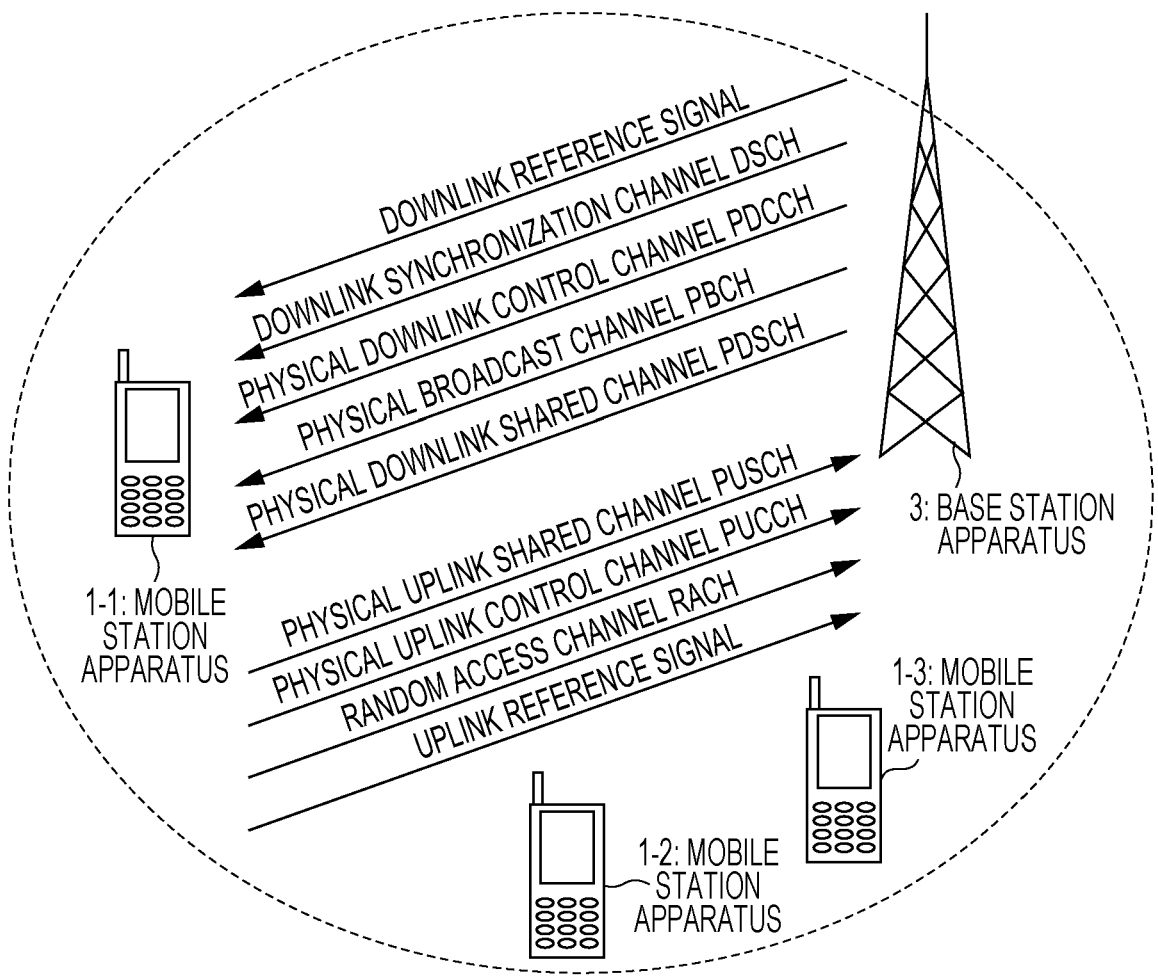
FIG. 6 is a diagram illustrating the configuration of channels in EUTRA.
Figure 7:
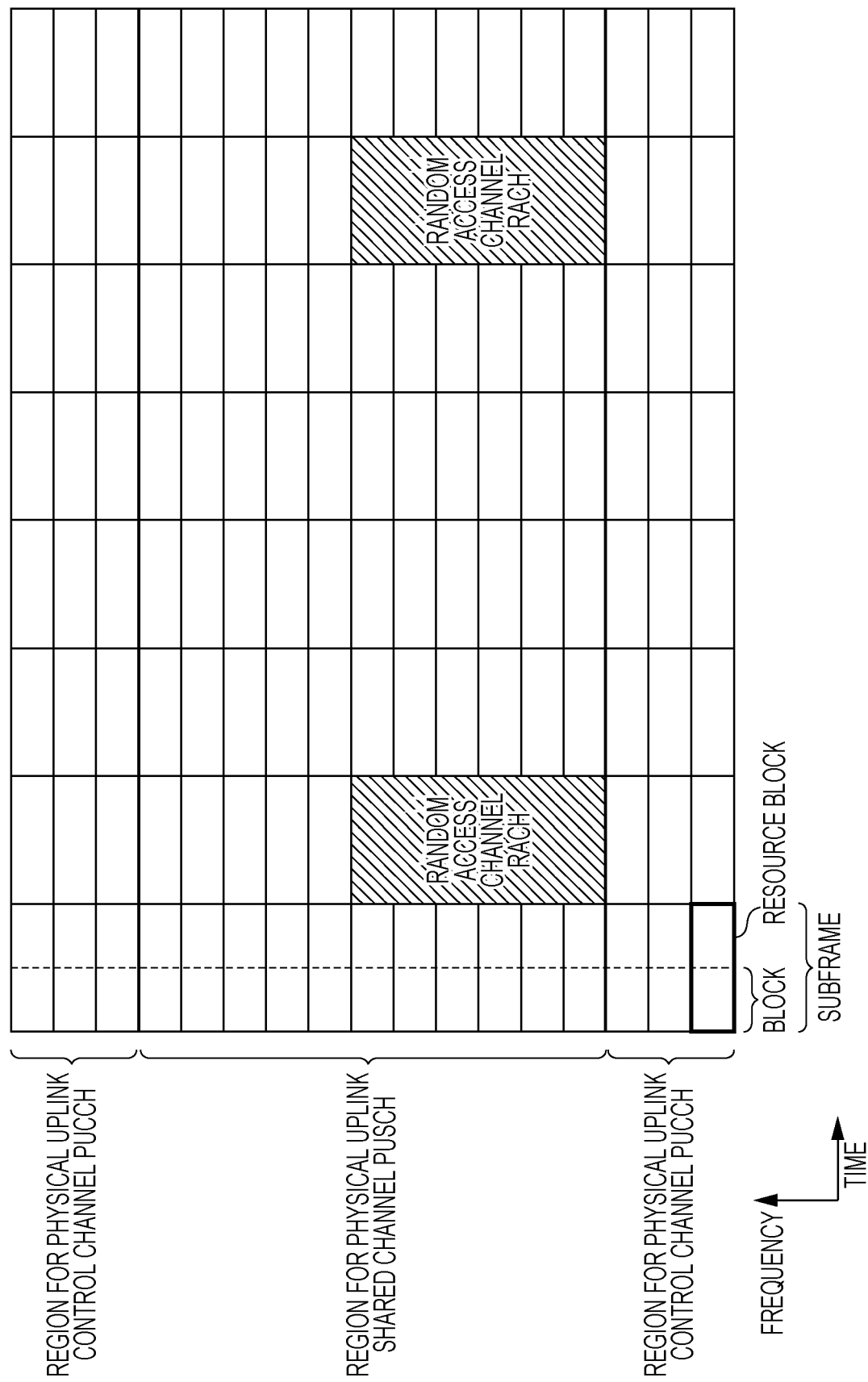
FIG. 7 is a diagram illustrating the configuration of uplink in EUTRA.

FIG. 6 is a diagram illustrating the configuration of channels in EUTRA. FIG. 7 is a diagram illustrating the configuration of uplink in EUTRA. One block is constituted by twelve subcarriers and by seven OFDM symbols. Two blocks constitute one resource block (RB). One resource block is used for each of the physical uplink shared channel PUSCH and the physical uplink control channel PUCCH. Six resource blocks are used to form one random access channel RACH.

The uplink reference signal is mapped to specific OFDM symbols within each resource block. As illustrated in FIG. 7, the individual uplink channels are distributed to a region for the physical uplink shared channel PUSCH, a region for the physical uplink control channel PUCCH, and the random access channel RACH. Information about the region for the physical uplink shared channel PUSCH and the region for the physical uplink control channel PUCCH is broadcast from the base station apparatus. The base station apparatus also allocates, to each mobile station apparatus, radio resources for the physical uplink shared channel PUSCH and the physical uplink control channel PUCCH from the corresponding regions. Note that the random access channel RACH is mapped at certain intervals.

The physical downlink shared channel PDSCH is used for transmitting user data and control data from the base station apparatus to the mobile station apparatus. The physical downlink control channel PDCCH is used by the base station apparatus to notify the mobile station apparatus of control information, such as radio resource allocation information for the physical downlink shared channel PDSCH and the physical uplink shared channel PUSCH. The downlink reference signal is used for demodulating the physical downlink shared channel PDSCH and the physical downlink control channel PDCCH. The downlink synchronization channel DSCH is used by the mobile station apparatus to establish downlink synchronization. The physical broadcast channel PBCH is used to broadcast information regarding system information of the base station apparatus.

The physical uplink shared channel PUSCH is used for transmitting user data and control data from the mobile station apparatus to the base station apparatus. Note that data transmitted and received on the physical uplink shared channel PUSCH and the physical downlink shared channel PDSCH is subjected to HARQ (Hybrid Automatic Repeat reQuest) processing in which data initially transmitted and data re-transmitted are combined at the time of re-transmission to improve the capability of correcting errors in the re-transmitted data. The physical uplink control channel PUCCH is used to notify the base station apparatus of control information, such as a response (Ack (Acknowledgement)/Nack (Negative acknowledgement)) to downlink data from the base station apparatus and downlink radio channel quality information.

The random access channel RACH is mainly used for transmitting a random access preamble from the mobile station apparatus to the base station apparatus in order to acquire transmission timing information. The random access preamble is transmitted during a random access procedure. The demodulation reference signal of the uplink reference signal is used by the base station apparatus to demodulate the physical uplink shared channel PUSCH. The demodulation reference signal is inserted at the fourth and eleventh symbol positions of the physical uplink shared channel PUSCH. The sounding reference signal of the uplink reference signal is used by the base station apparatus to measure an uplink radio channel quality. The sounding reference signal is inserted at the fourteenth symbol position of the physical uplink shared channel PUSCH. Note that a radio resource used for transmitting the sounding reference signal is separately allocated to each mobile station apparatus by the base station apparatus.

The random access procedure takes two forms: a procedure of contention based random access and a procedure of non-contention based random access (NPL 1).

Figure 8:
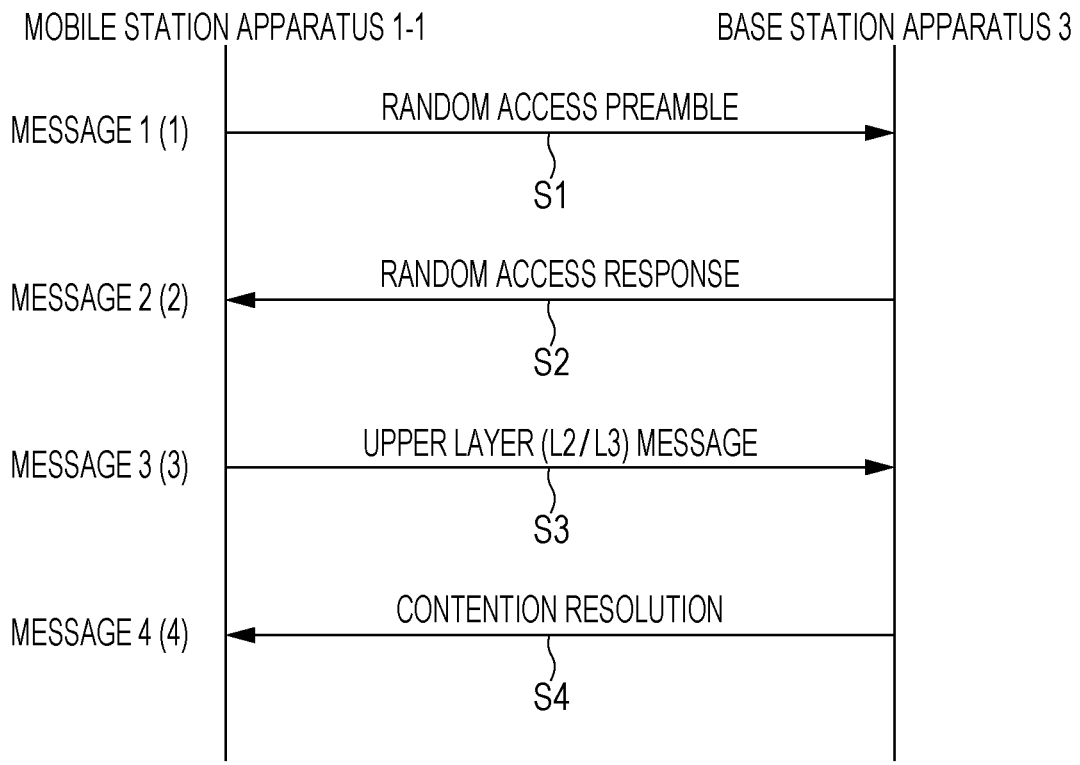
FIG. 8 is a diagram illustrating a contention based random access procedure.

FIG. 8 is a diagram illustrating the contention based random access procedure. Contention based random access is random access involving possible contention among mobile station apparatuses. Contention based random access is carried out to make a scheduling request or the like (i) when initial access is attempted in a state where no connection (communication) to the base station apparatus has been established and (ii) when uplink data transmission occurs in the mobile station apparatus in a state where connection to the base station apparatus is maintained but uplink synchronization is lost.

Figure 9:
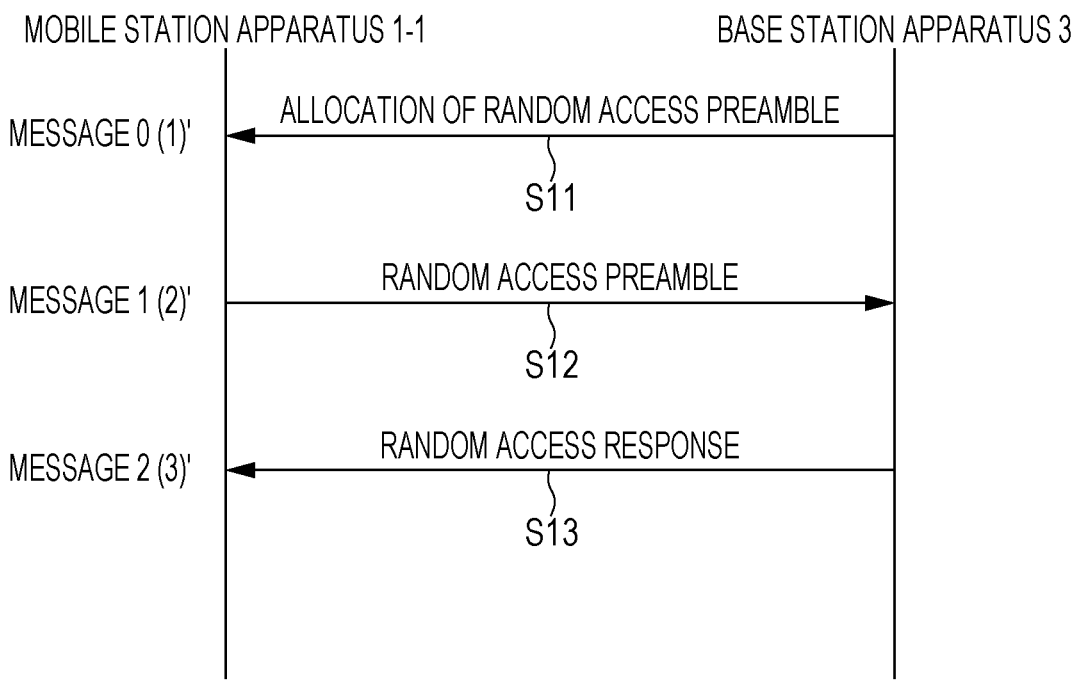
FIG. 9 is a diagram illustrating a non-contention based random access procedure.

FIG. 9 is a diagram illustrating the non-contention based random access procedure. Non-contention based random access is random access which does not involve any contention among mobile station apparatuses. The mobile station apparatus is instructed to perform non-contention based random access by the base station apparatus in special cases, such as (i) in a case where handover is carried out to quickly establish uplink synchronization between the mobile station apparatus and the base station apparatus when uplink synchronization is lost and (ii) in a case where the transmission timing of the mobile station apparatus is invalid, in a state where connection between the base station apparatus and the mobile station apparatus is maintained. In response to the instruction, the mobile station apparatus starts random access (NPL 1). Non-contention based random access is specified by a message of the RRC (Radio Resource Control: Layer 3) layer and control data on the physical downlink control channel PDCCH.

The contention based random access procedure will be briefly described using FIG. 8. First, a mobile station apparatus 1-1 transmits a random access preamble to a base station apparatus 3 (message 1: (1), step S1). Then, the base station apparatus 3 having received the random access preamble transmits a response (random access response) to the random access preamble to the mobile station apparatus 1-1 (message 2: (2), step S2). The mobile station apparatus 1-1 transmits an upper layer (Layer 2/Layer 3) message on the basis of scheduling information contained in the random access response (message 3: (3), step S3). The base station apparatus 3 transmits a contention check message to the mobile station apparatus 1-1 from which the base station apparatus 3 has successfully received the upper layer message (3) (message 4: (4), step S4). Note that contention based random access is also referred to as "random preamble transmission".

The non-contention based random access procedure will be briefly described using FIG. 9. First, the base station apparatus 3 notifies the mobile station apparatus 1-1 of a preamble number (or sequence number) and a random access channel number to be used (message 0: (1)', step S11). The mobile station apparatus 1-1 transmits a random access preamble of the specified preamble number on the specified random access channel RACH (message 1: (2)', step S12). Then, the base station apparatus 3 having received the random access preamble transmits a response (random access response) to the random access preamble to the mobile station apparatus 1-1 (message 2: (3)', step S13). In a case where the value of the notified preamble number is 0, the mobile station apparatus 1-1 carries out contention based random access. Note that non-contention based random access is also referred to as "dedicated preamble transmission".

A procedure in which the mobile station apparatus 1-1 establishes a connection to the base station apparatus 3 will be described using FIGS. 8 and 10. First, the mobile station apparatus 1-1 acquires system information about the base station apparatus 3 from the physical broadcast channel PBCH or the like. The mobile station apparatus 1-1 executes a random access procedure on the basis of random access related information contained in the system information so as to establish a connection to the base station apparatus 3. Specifically, the mobile station apparatus 1-1 generates a random access preamble on the basis of the random access related information or the like contained in the system information. The mobile station apparatus 1-1 then transmits the random access preamble on the random access channel RACH (message 1: (1)).

The base station apparatus 3 (i) calculates, upon detecting the random access preamble transmitted from the mobile station apparatus 1-1, an amount of difference in transmission timing between the mobile station apparatus 1-1 and the base station apparatus 3 by using the random access preamble; (ii) performs scheduling for transmitting a Layer 2 (L2)/Layer 3 (L3) message (specifies the position of an uplink radio resource (the position of the physical uplink shared channel PUSCH), a transmission format (message size), and so forth); (iii) assigns Temporary C-RNTI (Cell-Radio Network Temporary Identity: mobile station apparatus identification information); (iv) maps, onto the physical downlink control channel PDCCH, RA-RNTI (Random Access-Radio Network Temporary Identify: random access response identification information) which represents a response (random access response) addressed to the mobile station apparatus 1-1 that has transmitted the random access preamble on the random access channel RACH; and (v) transmits, on the physical downlink shared channel PDSCH, a random access response message which contains transmission timing information, scheduling information, the Temporary C-RNTI, and information about the received random access preamble (message 2: (2)).

Upon detecting the RA-RNTI on the physical downlink control channel PDCCH, the mobile station apparatus 1-1 checks the content of the random access response message mapped on the physical downlink shared channel PDSCH. If the random access response message contains information about the transmitted random access preamble, the mobile station apparatus 1-1 adjusts the uplink transmission timing on the basis of the transmission timing information; and transmits, using the scheduled radio resource and transmission format, an L2/L3 message which contains information for identifying the mobile station apparatus 1-1, such as C-RNTI (or Temporary C-RNTI) or IMSI (International Mobile Subscriber Identity) (message 3: (3)). Upon adjusting the transmission timing, the mobile station apparatus 1-1 starts a transmission timing timer, for which the adjusted transmission timing is valid. Note that the transmission timing becomes invalid upon expiration of this transmission timing timer. While the transmission timing is valid, the mobile station apparatus 1-1 is permitted to transmit data to the base station apparatus 3. When the transmission timing is invalid, the mobile station apparatus 1-1 is permitted to transmit only a random access preamble. A period for which the transmission timing is valid is also referred to as an "uplink synchronized state", whereas a period for which the transmission timing is invalid is also referred to as an "uplink non-synchronized state".

Upon receiving the L2/L3 message from the mobile station apparatus 1-1, the base station apparatus 3 transmits, using the C-RNTI (or Temporary C-RNTI) or IMSI contained in the received L2/L3 message, a contention check (contention resolution) message to the mobile station apparatus 1-1 in order to determine whether or not contention has occurred among the mobile station apparatuses 1-1 to 1-3 (message 4: (4)).

The mobile station apparatus 1-1 re-transmits the random access preamble (message 1: (1)) if the mobile station apparatus 1-1 does not detect any random access response message containing the preamble number corresponding to the transmitted random access preamble within a certain period, has failed to transmit the message 3, or does not detect identification information of the mobile station apparatus 1-1 in the contention check message within a certain period. If the number of times the random access preamble has been transmitted exceeds the maximum number of times the random access preamble is permitted to be transmitted, which is indicated by the system information, the mobile station apparatus 1-1 determines that random access has failed and disconnects communication to the base station apparatus 3. After the random access procedure is successfully completed, control data for establishing a connection is further exchanged between the base station apparatus 3 and the mobile station apparatus 1-1. At this time, the base station apparatus 3 notifies the mobile station apparatus 1-1 of allocation information regarding the uplink reference signal and the physical uplink control channel PUCCH which are allocated individually.

Figure 10:
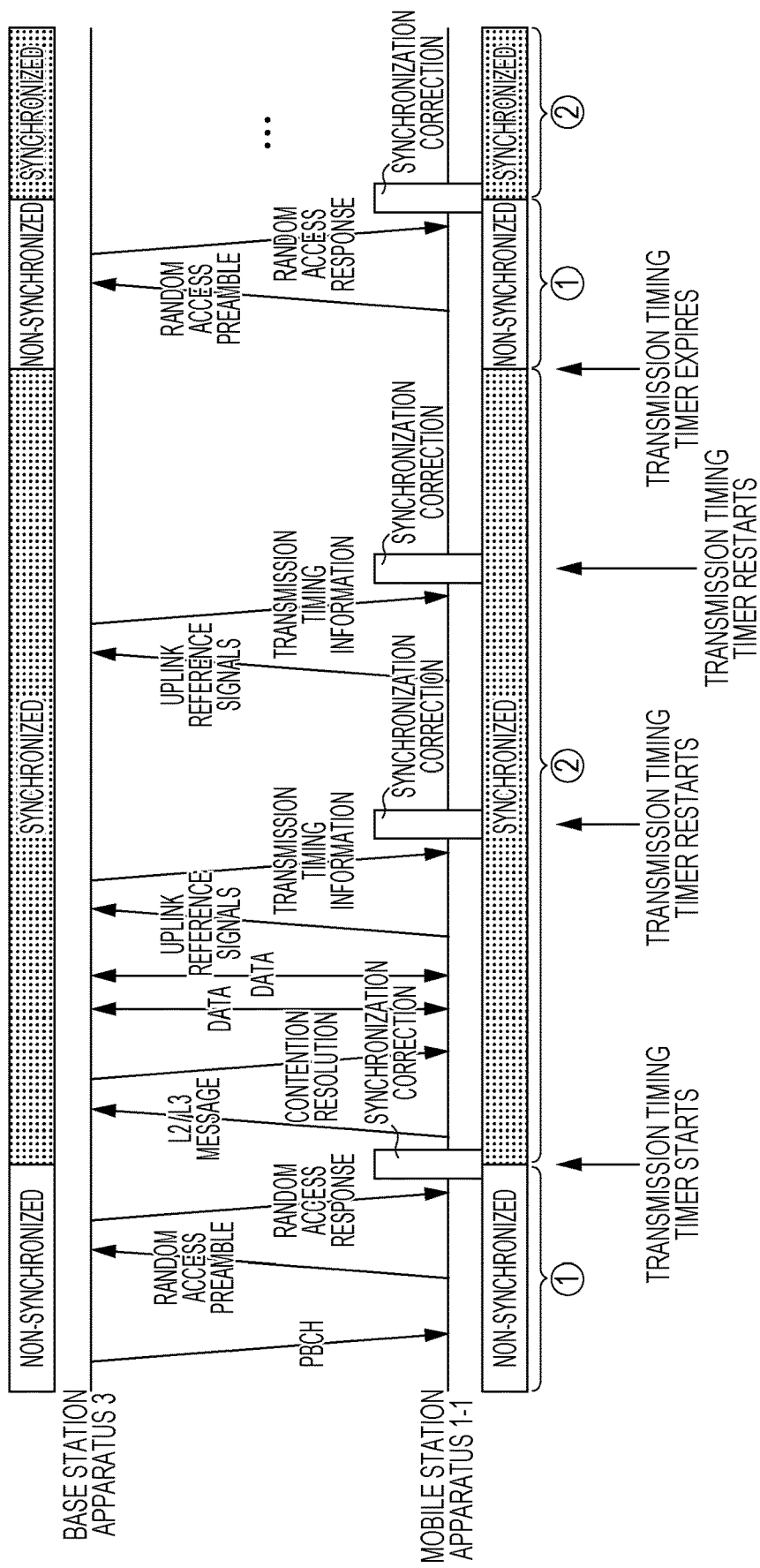
FIG. 10 is a diagram illustrating a transmission timing updating procedure.

As illustrated in FIG. 10, after the random access procedure has completed, the uplink transmission timing is updated in a manner as follows: the base station apparatus 3 (i) measures the uplink reference signal (the sounding reference signal or the demodulation reference signal) transmitted from the mobile station apparatus 1-1 to obtain transmission timing information, and (ii) notifies the mobile station apparatus 1-1 of the obtained transmission timing information. After updating the transmission timing information to the one which the mobile station apparatus 1-1 is notified of by the base station apparatus 3, the mobile station apparatus 1-1 restarts a corresponding transmission timing timer. Note that the base station apparatus 3 also has the same transmission timing timer as the mobile station apparatus 1-1. The base station apparatus 3 starts or restarts the transmission timing timer upon transmitting the transmission timing information. In this way, the base station apparatus 3 and the mobile station apparatus 1-1 manage the uplink synchronized state. The transmission timing becomes invalid upon expiration of the transmission timing timer, and uplink transmission is stopped except for transmission of a random access preamble.

In 3GPP, discussions over Advanced-EUTRA which is further advancements for EUTRA have begun. Advanced-EUTRA assumes communications at a downlink peak transmission rate of 1 Gbps or higher and at an uplink peak transmission rate of 500 Mbps or higher by using a band having a bandwidth of up to 100 MHz in each of the uplink and the downlink.

Figure 11:
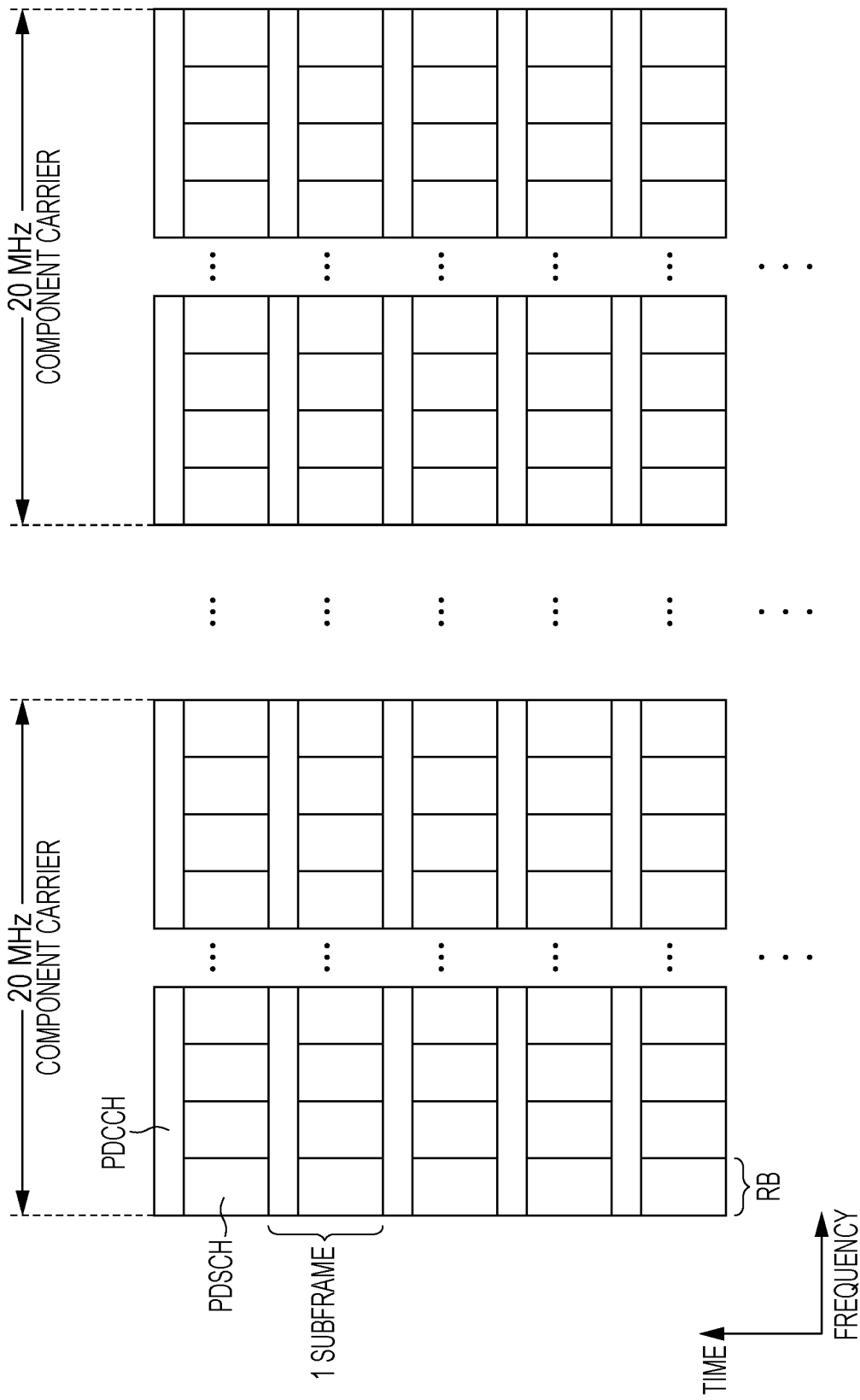
FIG. 11 is an explanatory diagram regarding downlink component carriers in Advanced-EUTRA.
Figure 12:
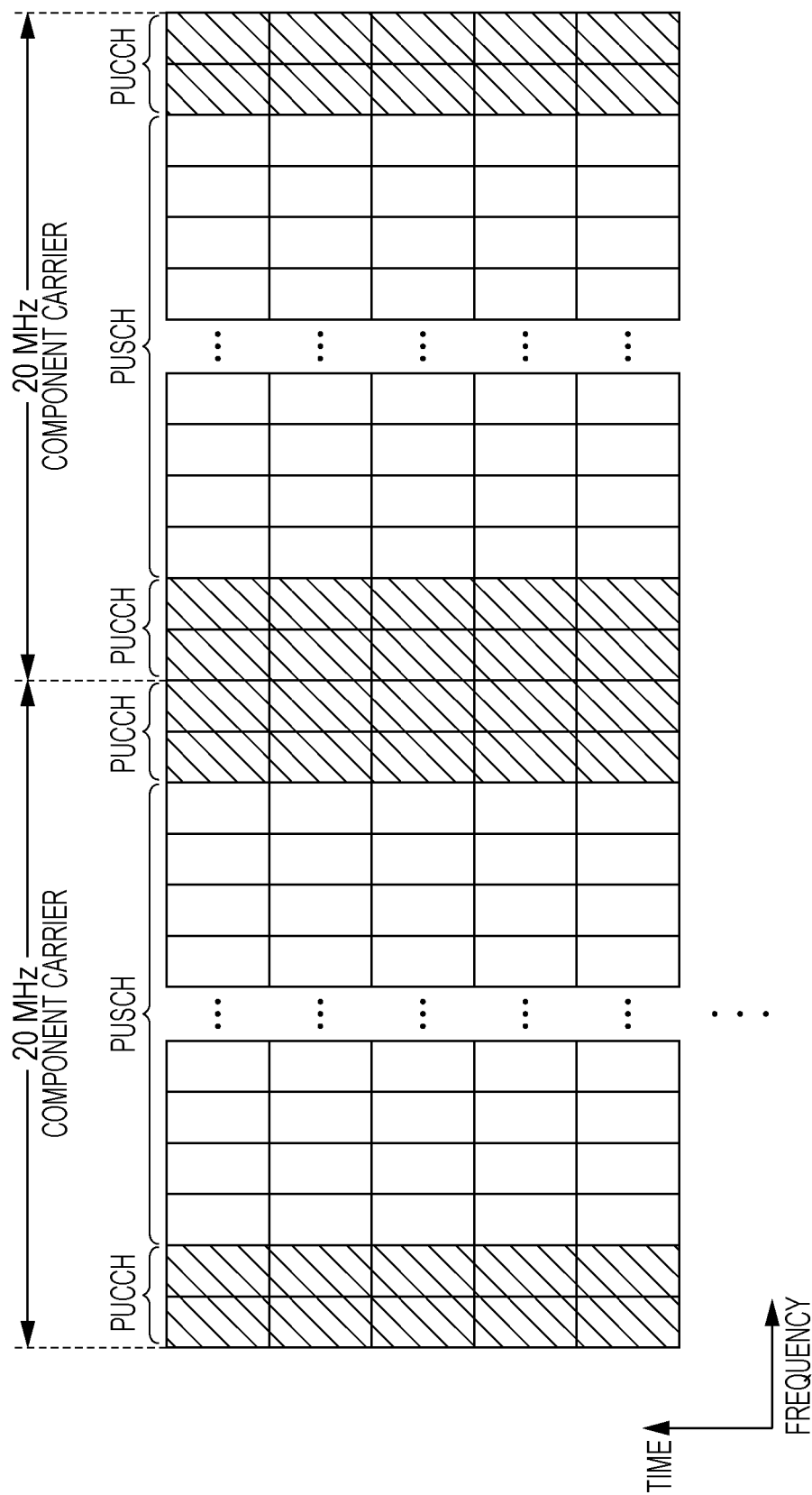
FIG. 12 is an explanatory diagram regarding uplink component carriers in Advanced-EUTRA.

FIG. 11 is an explanatory diagram regarding downlink component carriers in Advanced-EUTRA. FIG. 12 is an explanatory diagram regarding uplink component carriers in Advanced-EUTRA.

It is conceived that a band of up to 100 MHz is realized in Advanced-EUTRA by aggregating a plurality of EUTRA bands, each of which has a bandwidth of 20 MHz or less, in order to support EUTRA mobile station apparatuses. In Advanced-EUTRA, each EUTRA band of 20 MHz or less is called a "component carrier (CC)" (NPL 2). One downlink component carrier and one uplink component carrier constitute one cell. Note that one downlink component carrier alone can constitute one cell.

In Advanced-EUTRA, a plurality of cells are used to perform communication. In order to reduce the load imposed on the base station apparatus and the mobile station apparatus as much as possible, one cell among the plurality of cells is set as a primary cell and the rest of the cells are set as secondary cells. The physical uplink control channel PUCCH is allocated to a cell that serves as the primary cell so as to set special functions, such as permission for random access, for the primary cell.

Figure 13:
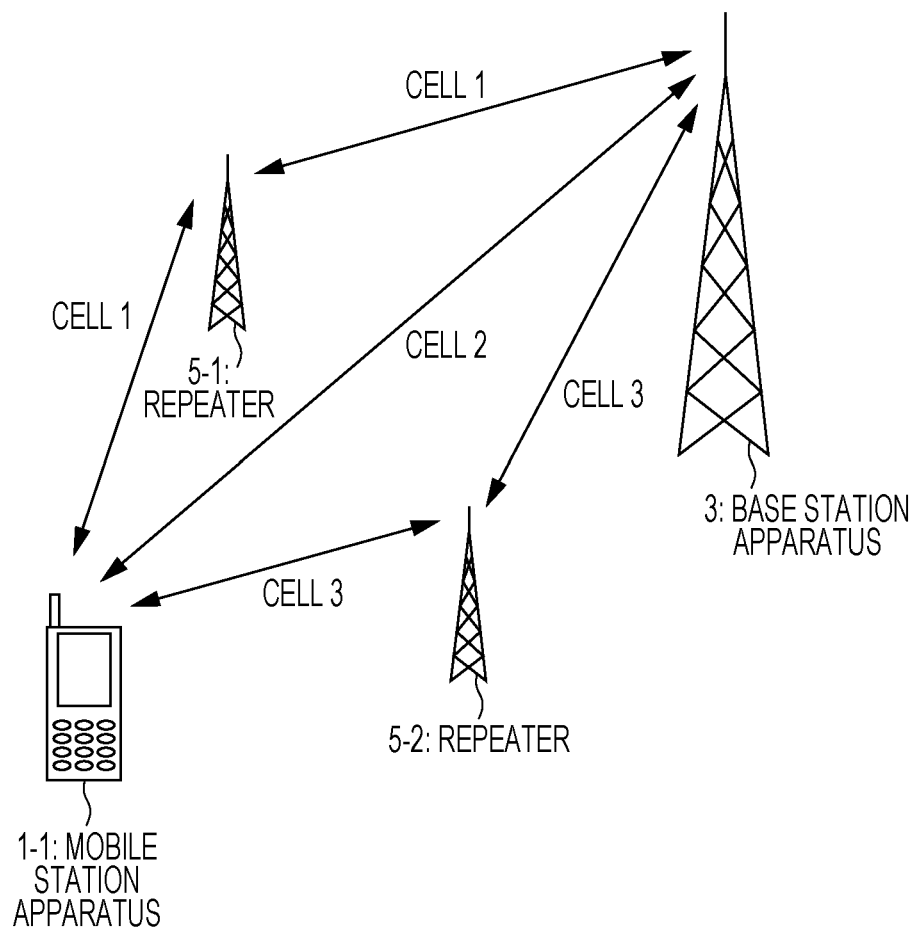
FIG. 13 is a diagram illustrating an example in which a mobile station apparatus communicates with a base station apparatus via repeaters.

The base station apparatus assigns, from a plurality of cells, one or more cells suitable for the communication capacity and communication condition of the mobile station apparatus. The mobile station apparatus transmits and receives data to and from the base station apparatus via the one or more assigned cells. In a case where a mobile station apparatus performs communication with a base station apparatus by using a plurality of cells, the mobile station apparatus possibly accesses the bases station apparatus via a repeater or the like as illustrated in FIG. 13. In such a case, the reception timing at which the mobile station apparatus receives data on the downlink component carrier and/or the transmission timing at which the mobile station apparatus performs transmission to the base station apparatus on the uplink component carrier differs from one cell to another. In particular, in a case where the transmission timings at which the mobile station apparatus performs transmission to the base station apparatus on individual uplink component carriers differ from one another, the mobile station apparatus is required to adjust the transmission timings for the individual uplink component carriers of individual cells before transmitting data to the base station apparatus.

DESCRIPTION OF CONFIGURATION

Figure 1:
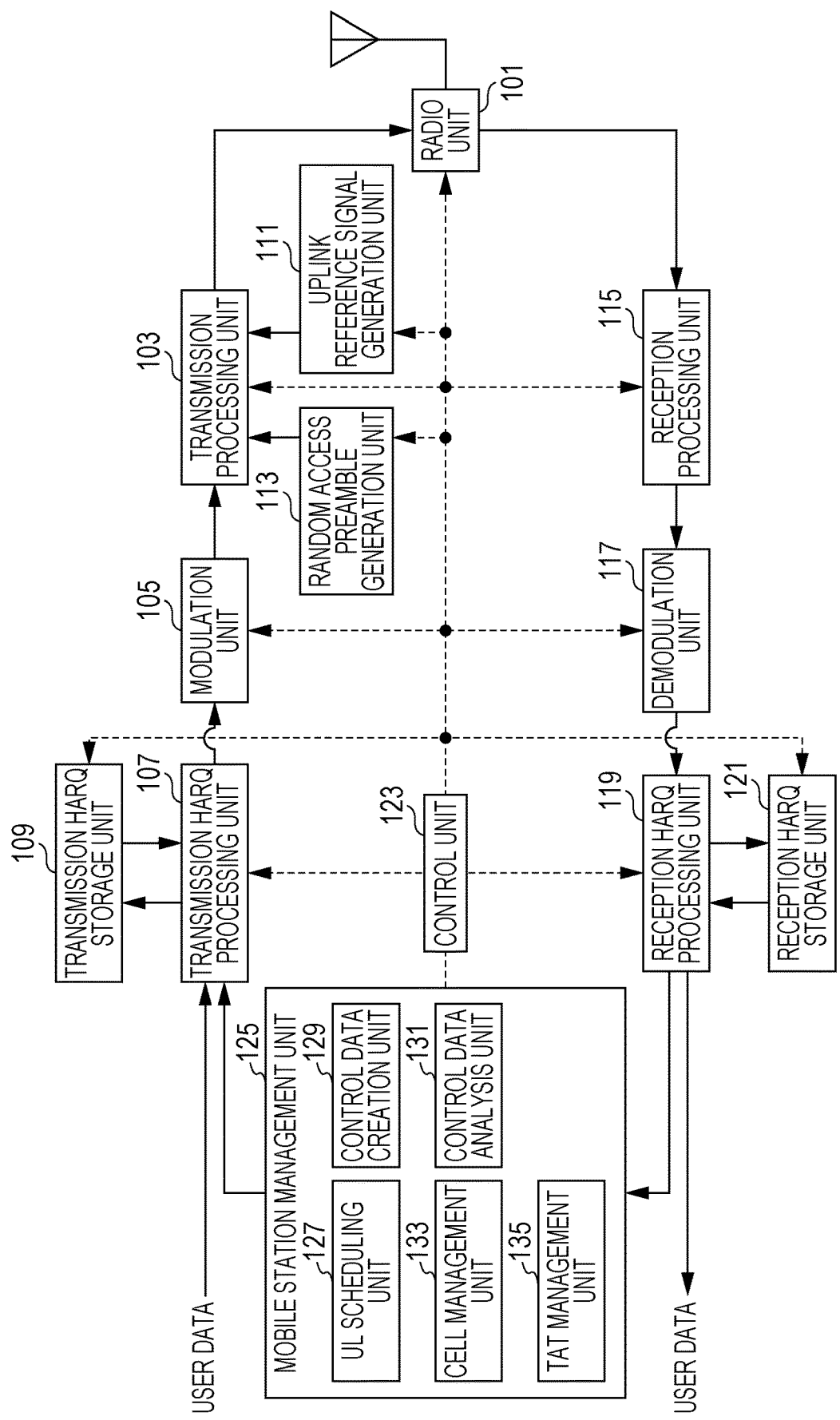
FIG. 1 is a diagram illustrating the configuration of a mobile station apparatus according to an embodiment of the present invention.

FIG. 1 is a diagram illustrating the configuration of a mobile station apparatus according to an embodiment of the present invention. Mobile station apparatuses 1-1 to 1-3 each include a radio unit 101, a transmission processing unit 103, a modulation unit 105, a transmission HARQ processing unit 107, a transmission HARQ storage unit 109, an uplink reference signal generation unit 111, a random access preamble generation unit 113, a reception processing unit 115, a demodulation unit 117, a reception HARQ processing unit 119, a reception HARQ storage unit 121, a control unit 123, and a mobile station management unit 125. The mobile station management unit 125 includes a UL scheduling unit 127, a control data creation unit 129, a control data analysis unit 131, a cell management unit 133, and a TAT management unit 135.

User data and control data are input to the transmission HARQ processing unit 107. In response to an instruction from the control unit 123, the transmission HARQ processing unit 107 encodes the input data and performs puncture processing on the encoded data. The transmission HARQ processing unit 107 then outputs the punctured data to the modulation unit 105 and outputs the encoded data to the transmission HARQ storage unit 109. Also, when the transmission HARQ processing unit 107 is instructed by the control unit 123 to re-transmit data, the transmission HARQ processing unit 107 (i) acquires the encoded data from the transmission HARQ storage unit 109, (ii) performs puncture processing of a kind different from the one performed last time, and (iii) outputs the punctured data to the modulation unit 105. The transmission HARQ storage unit 109 stores the data input from the transmission HARQ processing unit 107, and outputs the stored data to the transmission HARQ processing unit 107 in response to an instruction from the transmission HARQ processing unit 107. The transmission HARQ storage unit 109 also deletes the data stored therein, in response to an instruction from the control unit 123.

The modulation unit 105 modulates the data input from the transmission HARQ processing unit 107, and outputs the resulting data to the transmission processing unit 103. The transmission processing unit 103 (i) maps pieces of data (or signals) input from the modulation unit 105, the uplink reference signal generation unit 111, and the random access preamble generation unit 113 onto corresponding channels of the uplink component carrier of each cell in response to an instruction from the control unit 123; and (ii) performs OFDM signal processing, such as serial/parallel conversion, DFT-IFFT (Inverse Fast Fourier Transform), and CP insertion, on the mapped pieces of data to generate an OFDM signal. The transmission processing unit 103 also adjusts the transmission timing of the signal output on the uplink component carrier of each cell, on the basis of the transmission timing information fed from the control unit 123, and outputs the OFDM signal to the radio unit 101 after adjusting the transmission timing.

In response to an instruction from the control unit 123, the uplink reference signal generation unit 111 generates uplink reference signals on the basis of uplink reference signal generation information acquired from the mobile station management unit 125, and outputs the generated uplink reference signals to the transmission processing unit 103. In response to an instruction from the control unit 123, the random access preamble generation unit 113 generates a random access preamble on the basis of random access related information acquired from the mobile station management unit 125, and outputs the generated random access preamble to the transmission processing unit 103.

In response to an instruction from the control unit 123, the radio unit 101 up-converts the signal input from the transmission processing unit 103 into a signal of a radio frequency, and transmits the signal from a transmit antenna. Also, the radio unit 101 down-converts a radio signal received from an antenna, and outputs the resulting signal to the reception processing unit 115. The reception processing unit 115 performs FFT (Fast Fourier Transform) processing on the signal input from the radio unit 101, and outputs the resulting signal to the demodulation unit 117. The demodulation unit 117 performs demodulation processing on the input data, and outputs the demodulated data to the reception HARQ processing unit 119.

The reception HARQ processing unit 119 performs decoding processing on the input data. If the decoding processing is successful, the reception HARQ processing unit 119 outputs control data to the mobile station management unit 125 and outputs user data to an upper layer. If the decoding processing performed on the input data is unsuccessful, the reception HARQ processing unit 119 outputs the data for which the decoding processing ended unsuccessful to the reception HARQ storage unit 121. When receiving re-transmitted data, the reception HARQ processing unit 119 combines the data stored in the reception HARQ storage unit 121 and the re-transmitted data with each other and performs decoding processing. Also, the reception HARQ processing unit 119 notifies the mobile station management unit 125 that whether or not decoding processing performed on the input data is successful. The reception HARQ storage unit 121 stores the data input from the reception HARQ processing unit 119, and outputs the data stored therein to the reception HARQ processing unit 119 in response to an instruction from the reception HARQ processing unit 119. Also, the reception HARQ storage unit 121 deletes the data stored therein, in response to an instruction from the control unit 123.

In accordance with an instruction from the mobile station management unit 125, the control unit 123 controls the radio unit 101, the transmission processing unit 103, the modulation unit 105, the transmission HARQ processing unit 107, the transmission HARQ storage unit 109, the uplink reference signal generation unit 111, the random access preamble generation unit 113, the reception processing unit 115, the demodulation unit 117, the reception HARQ processing unit 119, and the reception HARQ storage unit 121.

The mobile station management unit 125 includes the UL scheduling unit 127, the control data creation unit 129, the control data analysis unit 131, the cell management unit 133, and the TAT management unit 135. The control data creation unit 129 creates an Ack/Nack message for received data, on the basis of a data decoding result supplied from the reception HARQ processing unit 119. The control data creation unit 129 also creates control data, such as a message indicating a downlink radio quality, and outputs the created control data to the transmission HARQ processing unit 107. The control data analysis unit 131 analyzes control data input from the reception HARQ processing unit 119. The control data analysis unit 131 outputs, to the cell management unit 133, the cell system information, cell allocation information, a random access response message, and uplink reference signal generation information which are received from the base station apparatus 3. The control data analysis unit 131 also outputs the transmission timing information and the transmission timing timer information to the TAT management unit 135.

The UL scheduling unit 127 controls, via the control unit 123, the transmission processing unit 103, the modulation unit 105, and the transmission HARQ processing unit 107 in accordance with uplink data scheduling information or a response (ACK/NACK) to transmitted uplink data received from the base station apparatus 3. Also, the UL scheduling unit 127 instructs the cell management unit 133 to perform random access, in accordance with control information supplied from an upper layer.

The cell management unit 133 manages cells assigned by the base station apparatus 3. The cell management unit 133 manages (i) the physical channel configuration, transmission power information, and random access related information that are received for each cell from the base station apparatus 3; and (ii) the cell system information regarding each cell, such as uplink reference signal generation information, and radio resources individually allocated to the mobile station apparatus 1-1, such as radio resources for the uplink reference signal (sounding reference signal) and radio resources for the physical uplink control channel PUCCH. The cell management unit 133 notifies, via the control unit 123, the random access preamble generation unit 113 of the random access related information and the uplink reference signal generation unit 111 of the uplink reference signal generation information. When initiating communication or making an uplink data scheduling request, the cell management unit 133 instructs, via the control unit 123, the random access preamble generation unit 113 to transmit a random access preamble to the base station apparatus 3.

Upon being notified of expiration of a transmission timing timer by the TAT management unit 135, the cell management unit 133 instructs, via the control unit 123, (i) the transmission HARQ processing unit 107 to stop HARQ processing for a cell for which the transmission timing has expired, (ii) the transmission HARQ storage unit 109 to delete data stored therein in association with the cell for which the transmission timing has expired, and (iii) the uplink reference signal generation unit 111 to stop generating the uplink reference signal for the cell for which the transmission timing has expired. Also, the cell management unit 133 releases radio resources for the physical uplink control channel PUCCH and the uplink reference signal (sounding reference signal) that are allocated by the base station apparatus 3 to the cell for which the transmission timing has expired.

The TAT management unit 135 manages transmission timings and transmission timing timers for individual cells. The TAT management unit 135 also manages cell relationship information regarding cells having an identical transmission timing. When acquiring transmission timing information, the TAT management unit 135 notifies, via the control unit 123, the transmission processing unit 103 of the acquired timing information for a corresponding cell and cell information for which the transmission timing is to be updated, and starts or restarts the corresponding transmission timing timer. Then, the TAT management unit 135 notifies the cell management unit 133 that the transmission timing timer has started or restarted for the corresponding cell. Also, when the transmission timing timer has expired for a cell, the TAT management unit 135 notifies the cell management unit 133 that the transmission timing timer for the cell has expired.

Figure 2:
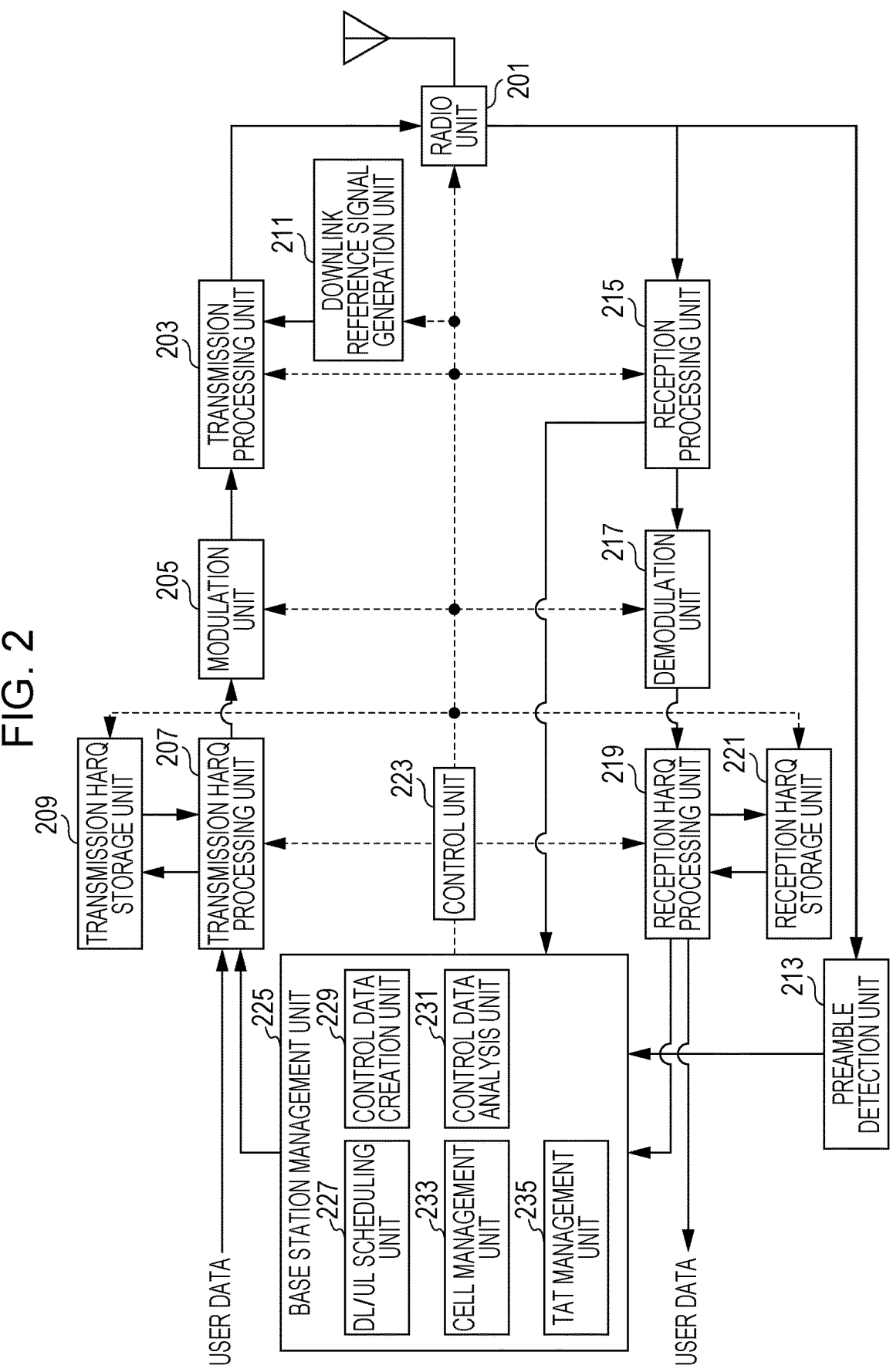
FIG. 2 is a diagram illustrating the configuration of a base station apparatus according to the embodiment of the present invention.

FIG. 2 is a diagram illustrating the configuration of the base station apparatus 3 according to the embodiment of the present invention. The base station apparatus 3 includes a radio unit 201, a transmission processing unit 203, a modulation unit 205, a transmission HARQ processing unit 207, a transmission HARQ storage unit 209, a downlink reference signal generation unit 211, a preamble detection unit 213, a reception processing unit 215, a demodulation unit 217, a reception HARQ processing unit 219, a reception HARQ storage unit 221, a control unit 223, and a base station management unit 225. The base station management unit 225 includes a DL/UL scheduling unit 227, a control data creation unit 229, a control data analysis unit 231, a cell management unit 233, and a TAT management unit 235.

User data and control data are input to the transmission HARQ processing unit 207. In response to an instruction from the control unit 223, the transmission HARQ processing unit 207 encodes the input data and performs puncture processing on the encoded data. The transmission HARQ processing unit 207 then outputs the punctured data to the modulation unit 205 and outputs the encoded data to the transmission HARQ storage unit 209. Also, when the transmission HARQ processing unit 207 is instructed by the control unit 223 to re-transmit data, the transmission HARQ processing unit 207 (i) acquires the encoded data from the transmission HARQ storage unit 209, (ii) performs puncture processing of a kind different from the one performed last time, and (iii) outputs the punctured data to the modulation unit 205. The transmission HARQ storage unit 209 stores data input from the transmission HARQ processing unit 207, and outputs the data stored therein to the transmission HARQ processing unit 207 in response to an instruction from the transmission HARQ processing unit 207. The transmission HARQ storage unit 209 also deletes the data stored therein, in response to an instruction from the control unit 223.

The modulation unit 205 modulates the data input from the transmission HARQ processing unit 207, and outputs the resulting data to the transmission processing unit 203. The transmission processing unit 203 (i) maps pieces of data (or signals) input from the modulation unit 205 and the downlink reference signal generation unit 211 to corresponding channels, such as the physical downlink control channel PDCCH, the downlink synchronization channel DSCH, the physical broadcast channel PBCH, and the physical downlink shared channel PDSCH, of the downlink component carrier of each cell in response to an instruction from the control unit 223; and (ii) performs OFDM signal processing, such as serial/parallel conversion, IFFT (Inverse Fast Fourier Transform), and CP insertion, on the mapped pieces of data to generate an OFDM signal. The transmission processing unit 203 then outputs the generated OFDM signal to the radio unit 201.

In response to an instruction from the control unit 223, the radio unit 201 up-converts the signal input from the transmission processing unit 203 into a signal of a radio frequency, and transmits the signal from a transmit antenna to the mobile station apparatuses 1-1 to 1-3. The radio unit 201 also receives a radio signal from the mobile station apparatus 1-1 with an antenna, down-converts the received signal into a baseband signal, and outputs the resulting received signal to the reception processing unit 215 or the preamble detection unit 213. The reception processing unit 215 performs FFT (Fast Fourier Transform) processing on the signal input from the radio unit 201, and outputs the resulting signal to the demodulation unit 217. The reception processing unit 215 also measures a radio channel quality and an amount of difference in transmission timing from the uplink reference signal (sounding reference signal), and supplies the measurement result to the base station management unit 225. Note that the use of a single-carrier scheme, such as DFT-spread OFDM, as an uplink communication scheme is assumed but a multi-carrier scheme, such as OFDM, may be used. The demodulation unit 217 performs demodulation processing on the input data, and outputs the demodulated data to the reception HARQ processing unit 219.

The reception HARQ processing unit 219 performs decoding processing on the input data. If the decoding processing is successful, the reception HARQ processing unit 219 outputs control data to the base station management unit 225 and outputs user data to an upper layer. If the decoding processing performed on the input data is unsuccessful, the reception HARQ processing unit 219 outputs the data for which the decoding processing ended unsuccessful to the reception HARQ storage unit 221. When receiving re-transmitted data, the reception HARQ processing unit 219 combines the data stored in the reception HARQ storage unit 221 and the re-transmitted data with each other and performs decoding processing. Also, the reception HARQ processing unit 219 notifies the base station management unit 225 that whether or not decoding processing performed on the input data is successful. The reception HARQ storage unit 221 stores the data input from the reception HARQ processing unit 219, and outputs the data stored therein to the reception HARQ processing unit 219 in response to an instruction from the reception HARQ processing unit 219. Also, the reception HARQ storage unit 221 deletes the data stored therein, in response to an instruction from the control unit 223.

The preamble detection unit 213 performs correlation processing on the signal input from the radio unit 201 to detect a random access preamble. Upon detecting a random access preamble, the preamble detection unit 213 calculates an amount of difference in transmission timing on the basis of the detected random access preamble. The preamble detection unit 213 notifies the base station management unit 225 of the cell for which the random access preamble has been detected, information about the detected preamble, and the amount of difference in transmission timing. In accordance with an instruction from the base station management unit 225, the control unit 223 controls the radio unit 201, the transmission processing unit 203, the modulation unit 205, the transmission HARQ processing unit 207, the transmission HARQ storage unit 209, the downlink reference signal generation unit 211, the reception processing unit 215, the demodulation unit 217, the reception HARQ processing unit 219, and the reception HARQ storage unit 221.

The base station management unit 225 includes the DL/UL scheduling unit 227 that performs downlink and uplink scheduling, the control data creation unit 229, the control data analysis unit 231, the cell management unit 233, and the TAT management unit 235. The DL/UL scheduling unit 227 performs scheduling for mapping user data and control data to corresponding downlink channels, in accordance with the downlink radio channel quality information which the base station apparatus 3 is notified by the mobile station apparatus 1-1 and user data information notified by an upper layer or control data created by the control data creation unit 229. The DL/UL scheduling unit 227 then supplies the scheduling result to the control unit 223. The DL/UL scheduling unit 227 also performs scheduling for mapping user data to corresponding uplink channels, in accordance with the result regarding the uplink radio channel quality supplied from the reception processing unit 215 and a radio resource allocation request transmitted from the mobile station apparatus 1-1. When being notified of detection of a random access preamble by the preamble detection unit 213, the DL/UL scheduling unit 227 allocates the physical uplink shared channel PUSCH and notifies the control data creation unit 229 of the allocated physical uplink shared channel PUSCH and a preamble number. When being notified of transmission timing information by the TAT management unit 235, the DL/UL scheduling unit 227 determines whether or not to notify the mobile station apparatus 1-1 of the transmission timing information in accordance with the uplink and downlink scheduling state of the mobile station apparatus 1-1. In a case where the DL/UL scheduling unit 227 notifies the mobile station apparatus 1-1 of the transmission timing information, the DL/UL scheduling unit 227 reports to the TAT management unit 235 notification of the transmission timing information, and notifies the control data creation unit 229 of the transmission timing information.

The control data creation unit 229 creates control data to be mapped on the physical downlink control channel PDCCH and control data to be mapped on the physical downlink shared channel PDSCH. The control data creation unit 229 creates control data, such as (i) a control message which contains scheduling information, and a response (ACK/NACK) to uplink data; (ii) a system information message which contains the physical channel configuration information, transmission power information for each channel, and random access related information; (iii) an initial setup message which contains setup information of a cell to be used (containing random access related information); (iv) a random access response message which contains a preamble number, transmission timing information, and scheduling information; (v) a contention resolution message; and (vi) a transmission timing message which contains transmission timing information. The control data analysis unit 231 controls, via the control unit 223, the transmission HARQ processing unit 207 in accordance with a result of a response (Ack/Nack) to downlink data, the response being transmitted from the mobile station apparatus 1-1.

The cell management unit 233 manages individual cells and pieces of system information (the physical channel configuration information, transmission power information for each channel, random access related information, and cell relationship information in terms of transmission timing) for the individual cells. The cell management unit 233 also assigns one or more cells to each of the mobile station apparatuses 1-1 to 1-3. Moreover, the cell management unit 233 allocates a radio resource for the uplink reference signal (sounding reference signal) and a radio resource for the physical uplink control channel PUCCH. The cell management unit 233 then supplies the control data creation unit 229 with the cell allocation information, the cell system information, and the radio resource allocation information to make a notification of the information about the assigned cells.

When being notified of expiration of a transmission timing timer by the TAT management unit 235, the cell management unit 233 (i) instructs, via the control unit 223, the transmission HARQ processing unit 207 to stop HARQ processing for a cell for which the transmission timing has expired, (ii) instructs the transmission HARQ storage unit 209 to delete data stored therein in association with the cell for which the transmission timing has expired, and (iii) releases the radio resource for the uplink reference signal (sounding reference signal) and the radio resource for the physical uplink control channel PUCCH that have been allocated to the mobile station apparatus 1-1.

The TAT management unit 235 manages transmission timings and transmission timing timers for individual cells assigned to the mobile station apparatuses 1-1 to 1-3. The TAT management unit 235 also manages cell relationship information regarding cells having an identical transmission timing. Upon acquiring an amount of difference in transmission timing from the preamble detection unit 213 or the reception processing unit 215, the TAT management unit 235 creates transmission timing information and notifies the DL/UL scheduling unit 227 of the created transmission timing information. Upon being notified by the cell management unit 233 that the transmission timing information has been transmitted, the TAT management unit 235 starts or restarts the corresponding transmission timing timer. Also, when a transmission timing timer has expired for a cell, the TAT management unit 235 notifies the cell management unit 233 that the transmission timing timer for the cell has expired.

DESCRIPTION OF OPERATION

The wireless communication system described in FIGS. 11 and 12 is assumed in which a base station apparatus assigns a plurality of cells to a mobile station apparatus and the mobile station apparatus performs communication with the base station apparatus via the plurality of assigned cells. Also, the wireless communication system described in FIG. 13 is assumed in which communication is performed via a plurality of cells in which transmission timings from the mobile station apparatus differ from one another.

In Advanced-EUTRA, a base station apparatus assigns one or more cells of different frequencies suitable for the communication capacity and communication condition of a mobile station apparatus from among a plurality of cells for each frequency. The mobile station apparatus transmits and receives data to and from the base station apparatus via the assigned cells. In a case where a mobile station apparatus performs communication with a base station apparatus by using a plurality of cells, the mobile station apparatus sometimes accesses the base station apparatus via a repeater or the like as illustrated in FIG. 13. In such a case, the reception timing at which the mobile station apparatus receives data on the downlink component carrier differs from one cell to another. Furthermore, the transmission timing at which transmission to the base station apparatus is performed differs from one uplink component carrier of one cell to another uplink component carrier of another cell. For this reason, in a case where the transmission timing at which transmission to the base station apparatus is performed differs from one uplink component carrier to another, the mobile station apparatus is required to adjust the transmission timing for the uplink component carrier of each cell.

Because the transmission timing is adjusted for the uplink component carrier of each cell, the transmission timing is updated or becomes invalid on a cell-by-cell basis. Accordingly, it is necessary to consider efficient operations performed by the mobile station to update the transmission timing or when the transmission timing has become invalid.

The base station apparatus groups cells into groups (hereinafter, grouped cells are referred to as a "transmission timing cell group"), in each of which cells have an identical transmission timing regarding transmission from the mobile station apparatus. The base station apparatus then sets one of the cells as a primary cell and sets the rest of the cells as secondary cells. The base station apparatus further permits random access in one cell in each transmission timing cell group, and transmits transmission timing information for the one cell in each transmission timing cell group. Also, the base station apparatus and the mobile station apparatus each have one transmission timing timer for each transmission timing cell group so as to manage a transmission timing. This allows the base station apparatus and the mobile station apparatus to efficiently manage transmission timings and transmission timing timers. In a case where a transmission timing timer for a transmission timing cell group constituted by a cell group including the primary cell has expired, the mobile station apparatus stops uplink transmission processing in all the cells. In a case where a transmission timing timer for a transmission timing cell group constituted only by the secondary cells has expired, the mobile station apparatus stops uplink transmission processing in the cells belonging to the transmission timing cell group for which the transmission timing timer has expired.

Note that in a case where a transmission timing timer for a transmission timing cell group constituted only by the secondary cells has expired, the mobile station apparatus does not stop uplink transmission processing in cells belonging to a transmission timing cell group (for example, the transmission timing cell group including the primary cell) that is different from the one for which the transmission timing timer has expired. For the transmission timing cell group constituted by a cell group including the primary cell (appropriately referred to as a first transmission timing cell group for convenience of explanation), the mobile station apparatus stops uplink transmission processing in cells belonging to the first transmission timing cell group only in a case where a transmission timing timer for the first transmission timing cell group has expired. In a case where a transmission timing timer for a transmission timing cell group constituted by a cell group including the secondary cells (appropriately referred to as a second transmission timing cell group for convenience of explanation) has expired, the mobile station apparatus does not stop uplink transmission processing in the cells belonging to the first transmission timing cell group. For each second transmission timing cell group, the mobile station apparatus stops uplink transmission processing in cells belonging to the second transmission timing cell group in a case where a transmission timing timer for the second transmission timing cell group has expired or in a case where a transmission timing timer for the first transmission timing cell group has expired. In a case where a transmission timing timer for one second transmission timing cell group has expired, the mobile station apparatus does not stop uplink transmission processing in cells belonging to another second transmission timing cell group that is different from the one second transmission timing cell group. By changing operation of the mobile station apparatus between the case where the transmission timing timer has expired for the primary cell and the case where the transmission timing timer has expired for the secondary cells in this way, the mobile station apparatus can efficiently perform uplink transmission processing.

That is, in a case where the base station apparatus and the mobile station apparatus exchange notifications via cells belonging to a plurality of transmission timing cell groups, the base station apparatus notifies or stops notifying the mobile station apparatus of transmission timing information of each transmission timing cell group while taking into account an amount of data transmitted from the mobile station apparatus. In this way, the base station apparatus continues or stops individual transmission timing timers, thereby making corresponding transmission timings valid or invalid. As a result, the base station apparatus can control a transmission section of the mobile station apparatus. Note that stopping uplink transmission indicates that transmission on the physical uplink control channel PUCCH, transmission on the physical uplink shared channel PUSCH, and transmission of the uplink reference signals (sounding reference signal and demodulation reference signal) are stopped except for transmission of a random access preamble.

Figure 3:
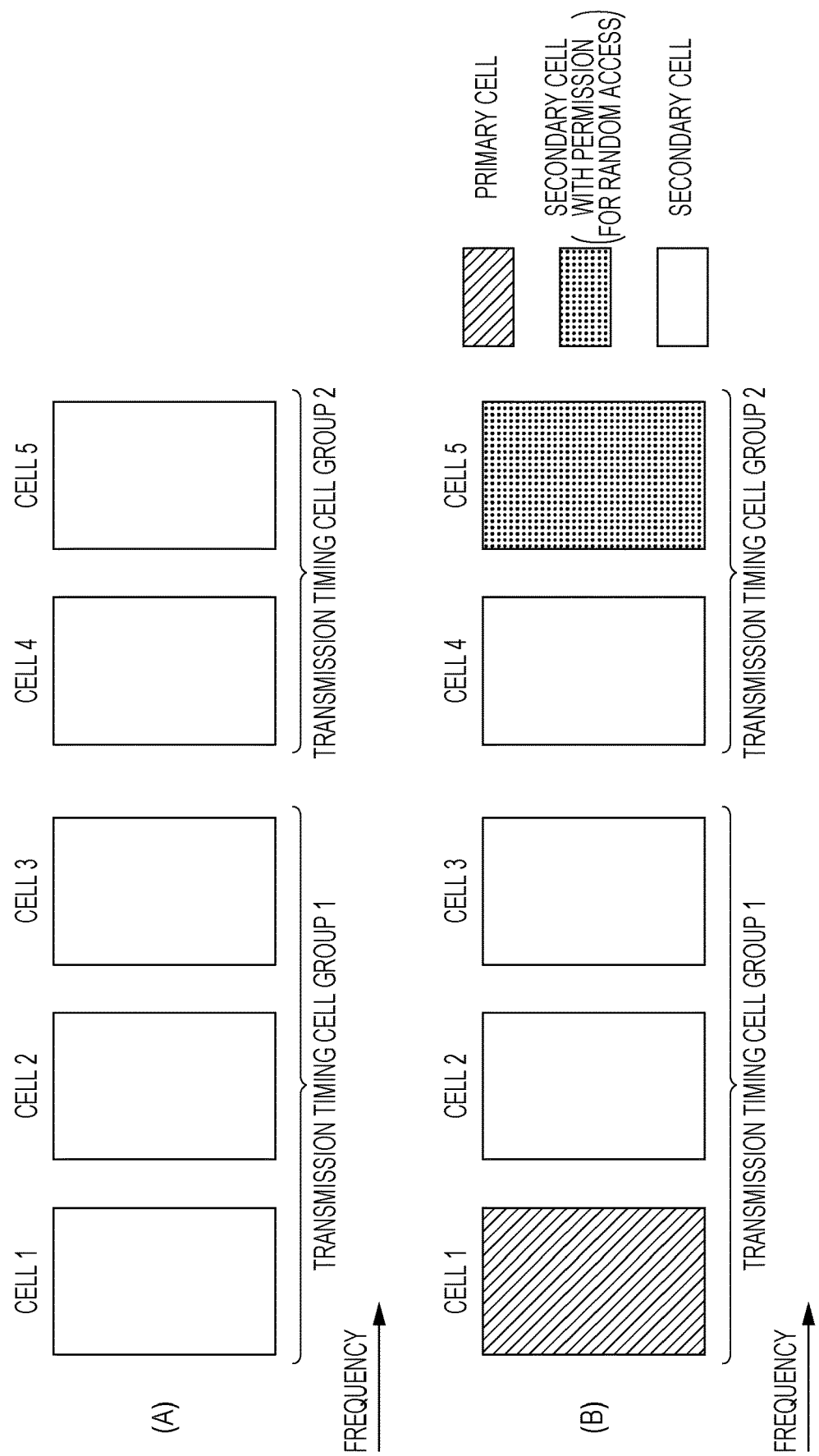
FIG. 3 is a diagram illustrating an example of the configuration of cells according to the embodiment of the present invention.

Operations performed by the mobile station apparatus 1-1 and the base station apparatus 3 will be described. By way of example, it is assumed that the base station apparatus 3 has cells 1 to 5, the cells 1 to 3 form a transmission timing cell group having an identical transmission timing, and the cells 4 and 5 form another transmission timing cell group having an identical transmission timing as illustrated in part (A) of FIG. 3.

The mobile station apparatus 1-1 carries out cell search and finds one cell of the base station apparatus 3. Herein, suppose that the mobile station apparatus 1-1 finds the cell 1. The mobile station apparatus 1-1 receives a physical broadcast channel PBCH or the like of the cell 1 and acquires system information (such as the physical channel configuration, transmission power information, and random access related information of the cell). Then, by using the random access related information contained in the system information, the mobile station apparatus 1-1 transmits a random access preamble on the random access channel RACH of the cell 1 for initial access. The mobile station apparatus 1-1 (i) acquires, from the base station apparatus 3, random access response information which contains transmission timing information regarding the cell 1; (ii) sets the transmission timing for the uplink component carrier of the cell 1; and (iii) starts the corresponding transmission timing timer. The mobile station apparatus 1-1 transmits a message 3 to the base station apparatus 3 via the cell 1. Note that the mobile station apparatus 1-1 includes the content indicating initial access in this message 3 before transmitting the message 3. Upon receiving a contention resolution from the base station apparatus 3, the mobile station apparatus 1-1 ends the contention based random access procedure.

After the random access procedure has been completed, the base station apparatus 3 assigns cells to be used by the mobile station apparatus 1-1 and notifies the mobile station apparatus 1-1 of the primary cell and a cell in which random access is permitted for each transmission timing cell group. Herein, as illustrated in part (B) of FIG. 3, the base station apparatus 3 assigns the cells 1 to 5 to the mobile station apparatus 1-1 and sets the cell 1 as the primary cell and the cells 2 to 5 as the secondary cells. The base station apparatus 3 makes a setting to permit random access in the cells 1 and 5. Also, the base station apparatus 3 notifies the mobile station apparatus 1-1 of setting information, such as (i) system information regarding the cells assigned to the mobile station apparatus 1-1 and group information regarding transmission timing cell groups, (ii) allocation information regarding the physical uplink control channel PUCCH of the primary cell, (iii) uplink reference signal (sounding reference signal) generation information and radio resource allocation information for transmitting the uplink reference signal (sounding reference signal), and (iv) radio resource allocation information regarding the periodical physical uplink shared channel PUSCH.

After acquiring the system information regarding the assigned cells and the group information regarding the transmission timing cell groups, the mobile station apparatus 1-1 sets the transmission timing of the cell 1 as uplink transmission timings of the cell 2 and 3 which belong to the same transmission timing cell group as the cell 1. Thereafter, the mobile station apparatus 1-1 and the base station apparatus 3 exchange data via downlink component carriers of the cells 1 to 5 and uplink component carriers of the cells 1 to 3.

In a case where the amount of data transmitted from the mobile station apparatus 1-1 has increased and there is a cell that is not being used by the mobile station apparatus 1-1, the base station apparatus 3 notifies, on the physical downlink control channel PDCCH, the mobile station apparatus 1-1 of random access instruction information for issuing an instruction to perform non-contention based random access in a random-access permitted cell. Herein, the base station apparatus 3 notifies the mobile station apparatus 1-1 of random access instruction information for the cell 5. The random access instruction information contains a preamble number and a random access channel number. The mobile station apparatus 1-1 checks the preamble number. If the preamble number indicates non-contention based random access, the mobile station apparatus 1-1 transmits a random access preamble on the random access channel RACH of the cell 5, by using the preamble and random access channel specified by the base station apparatus 3.

Upon detecting the random access preamble, the base station apparatus 3 determines transmission timing information from the random access preamble, and notifies the mobile station apparatus 1-1 of a random access response, which contains the transmission timing information, on the downlink component carrier of the cell 5. Upon receiving the random access response, the mobile station apparatus 1-1 sets the transmission timing contained in the random access response as an uplink transmission timing of the cell 5 and furthermore as an uplink transmission timing of the cell 4 which belongs to the same transmission timing cell group. The mobile station apparatus 1-1 starts a corresponding transmission timing timer. Then, the mobile station apparatus 1-1 completes the non-contention based random access procedure. Thereafter, data is exchanged between the mobile station apparatus 1-1 and the base station apparatus 3 by additionally using the uplink component carriers of the cells 4 and 5.

The mobile station apparatus 1-1 has one transmission timing timer for each transmission timing cell group, and starts or restarts a corresponding transmission timing timer upon receiving transmission timing information. Similarly, the base station apparatus 3 also has one transmission timing timer for each transmission timing cell group, and starts or restarts a corresponding transmission timing timer upon transmitting transmission timing information. While the transmission timing timer is running, uplink synchronization is established (the transmission timing is valid). In this state, the mobile station apparatus 1-1 is permitted to perform uplink transmissions on uplink component carriers of the target transmission timing cell group. Note that one transmission timing timer may be prepared for each cell. The base station apparatus 3 measures the uplink reference signal transmitted from the mobile station apparatus 1-1 to determine transmission timing information. In a case where the transmission timing has to be maintained, the base station apparatus 3 notifies the mobile station apparatus 1-1 of the transmission timing information.

In a case where the transmission timing timer for the transmission timing cell group including the primary cell has expired, the mobile station apparatus 1-1 (i) stops the transmission timing timer for the transmission timing cell group (of the cells 4 and 5) constituted only by the secondary cells; (ii) restricts uplink transmissions in all the cells (the cells 1, 2, 3, 4, and 5) except for transmission of a random access preamble in the primary cell; and (iii) deletes all data stored in the transmission HARQ storage unit 109 (hereinafter, referred to as a transmission HARQ buffer). Then, the mobile station apparatus 1-1 releases radio resources for the allocated physical uplink control channels PUCCHs and radio resources for the sounding reference signals allocated to all the cells (the cells 1, 2, 3, 4, and 5). Also, in a case where the mobile station apparatus 1-1 has acquired downlink and uplink allocation information, the mobile station apparatus 1-1 discards the allocation information regarding all the physical downlink shared channels PDSCHs and all the physical uplink shared channels PUSCHs.

Also, in a case where the transmission timing timer for the transmission timing cell group including the primary cell has expired, the base station apparatus 3 (i) stops the transmission timing timer for the transmission timing cell group (of the cells 4 and 5) constituted only by the secondary cells, (ii) stops allocation of the physical uplink shared channel PUSCH in all the cells assigned to the mobile station apparatus 1-1, and (iii) deletes all data stored in the reception HARQ storage unit 221 (hereinafter, referred to as a reception HARQ buffer). Then, the base station apparatus 3 releases radio resources for the physical uplink control channels PUCCHs allocated to the mobile station apparatus 1-1 and radio resources for the sounding reference signals allocated to all the cells.

In a case where the transmission timing timer for the transmission timing cell group constituted only by the secondary cells has expired, the mobile station apparatus 1-1 stops uplink transmissions in the cells (the cells 4 and 5) included in the transmission timing cell group for which the transmission timing timer has expired, and deletes data stored in the transmission HARQ buffer in association with the cells included in the transmission timing cell group for which the transmission timing timer has expired. The mobile station apparatus 1-1 releases radio resources for the sounding reference signals allocated to the cells included in the transmission timing cell group for which the transmission timing timer has expired. Also, in a case where the mobile station apparatus 1-1 has acquired downlink and uplink allocation information, the mobile station apparatus 1-1 discards allocation information for the physical uplink shared channels PUSCHs regarding the cells included in the transmission timing cell group for which the transmission timing timer has expired.

In a case where the transmission timing timer for the transmission timing cell group constituted only by the secondary cells has expired, the base station apparatus 3 stops allocation of the physical uplink shared channel PUSCH in the cells (the cells 4 and 5) included in the transmission timing cell group for which the transmission timing timer has expired, and deletes data stored in the reception HARQ storage unit 221 in association with the cells included in the transmission timing cell group for which the transmission timing timer has expired. The base station apparatus 3 then releases radio resources for the sounding reference signals allocated to the cells included in the transmission timing cell group, which is assigned to the mobile station apparatus 1-1 and for which the transmission timing timer has expired.

Figure 4:
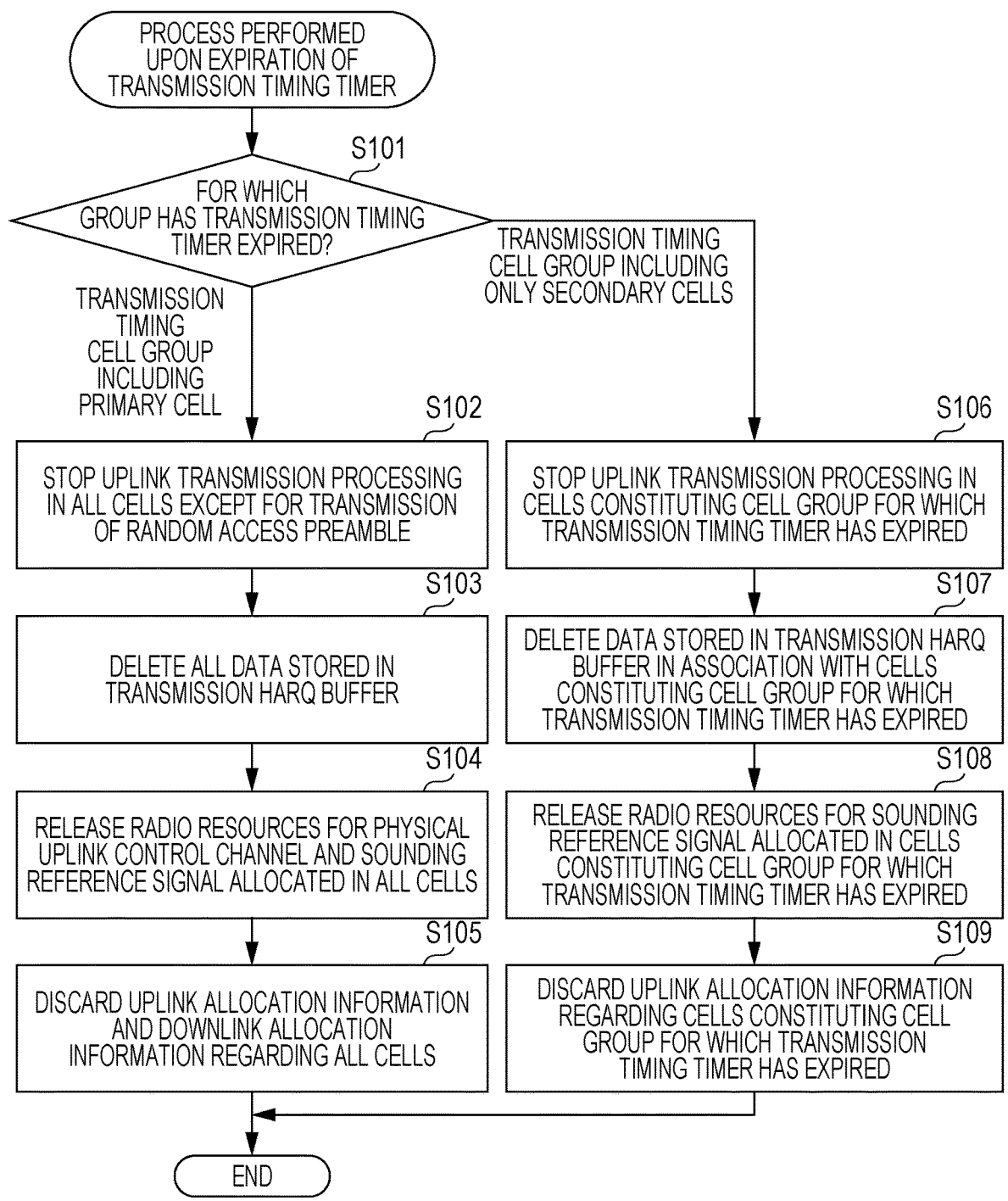
FIG. 4 is a flowchart illustrating an example of an operation performed by the mobile station apparatus when a transmission timing timer has expired.

FIG. 4 illustrates a flowchart of a process performed by the mobile station apparatus 1-1 in a case where a transmission timing timer has expired. In a case where a transmission timing timer has expired, the mobile station apparatus 1-1 determines for which transmission timing cell group the transmission timing timer has expired (step S101). If the transmission timing cell group for which the transmission timing timer has expired is a transmission timing cell group including the primary cell, the mobile station apparatus 1-1 stops a transmission timing timer for a transmission timing cell group constituted only by the secondary cells, and stops uplink transmission processing in all the cells except for transmission of a random access preamble in the primary cell (step S102). Subsequently, the mobile station apparatus 1-1 deletes all data stored in the transmission HARQ buffer (step S103). Then, the mobile station apparatus 1-1 releases radio resources for the allocated physical uplink control channel PUCCH and radio resources for the sounding reference signals that are allocated to all the cells (step S104). Also, if radio resources for the physical uplink shared channel PUSCH are periodically allocated, the mobile station apparatus 1-1 also releases these radio resources.

Moreover, in a case where the mobile station apparatus 1-1 has acquired downlink and uplink allocation information, the mobile station apparatus 1-1 discards allocation information regarding all the physical downlink shared channels PDSCHs and all the physical uplink shared channels PUSCHs (step S105). Note that while the transmission timing is invalid for the transmission timing cell group including the primary cell, the mobile station apparatus 1-1 may perform processing of detecting uplink allocation information that the mobile station apparatus 1-1 is notified of on the physical downlink control channel PDCCH. However, upon detecting the uplink allocation information, the mobile station apparatus 1-1 discards the acquired uplink allocation information. Note that if the mobile station apparatus 1-1 receives data on the physical downlink shared channel PDSCH, the mobile station apparatus 1-1 does not return a response (Ack/Nack) to the data to the base station apparatus 3 until the transmission timing becomes valid for the transmission timing cell group including the primary cell. The mobile station apparatus 1-1 may be configured not to release a radio resource for the physical uplink control channel PUCCH used for transmitting a response (Ack/Nack) to data among the physical uplink control channels PUCCHs allocated by the base station apparatus 3. In this case, after uplink synchronization is re-established, the mobile station apparatus 1-1 can immediately return a response to downlink data to the base station apparatus 3.

If the transmission timing cell group for which the transmission timing timer has expired is a transmission timing cell group constituted only by the secondary cells, the mobile station apparatus 1-1 stops uplink transmission processing in the cells included in the transmission timing cell group for which the transmission timing timer has expired (step S106). Even in this case, the mobile station apparatus 1-1 is permitted to transmit a random access preamble. Then, the mobile station apparatus 1-1 deletes data stored in the transmission HARQ buffer in association with the cells included in the transmission timing cell group for which the transmission timing timer has expired (step S107). The mobile station apparatus 1-1 releases radio resources for the sounding reference signals that are allocated to the cells included in the transmission timing cell group for which the transmission timing timer has expired (step S108).

In a case where the mobile station apparatus 1-1 has acquired downlink and uplink allocation information, the mobile station apparatus 1-1 also discards allocation information for the physical downlink shared channel PUSCH regarding the cells included in the transmission timing cell group for which the transmission timing timer has expired (step S109). Note that the mobile station apparatus 1-1 may perform processing of detecting uplink allocation information that the mobile station apparatus 1-1 is notified of on the physical downlink control channel PDCCH in the cells included in the transmission timing cell group for which the transmission timing timer has expired. However, upon detecting the uplink allocation information, the mobile station apparatus 1-1 discards the acquired uplink allocation information. If the mobile station apparatus 1-1 receives data on the physical downlink shared channel PDSCH while the transmission timing of the transmission timing cell group constituted only by the secondary cells is invalid, the mobile station apparatus 1-1 returns a response (Ack/Nack) to the data to the base station apparatus 3 by using a radio resource for the physical uplink control channel PUCCH of the primary cell.

Figure 5:
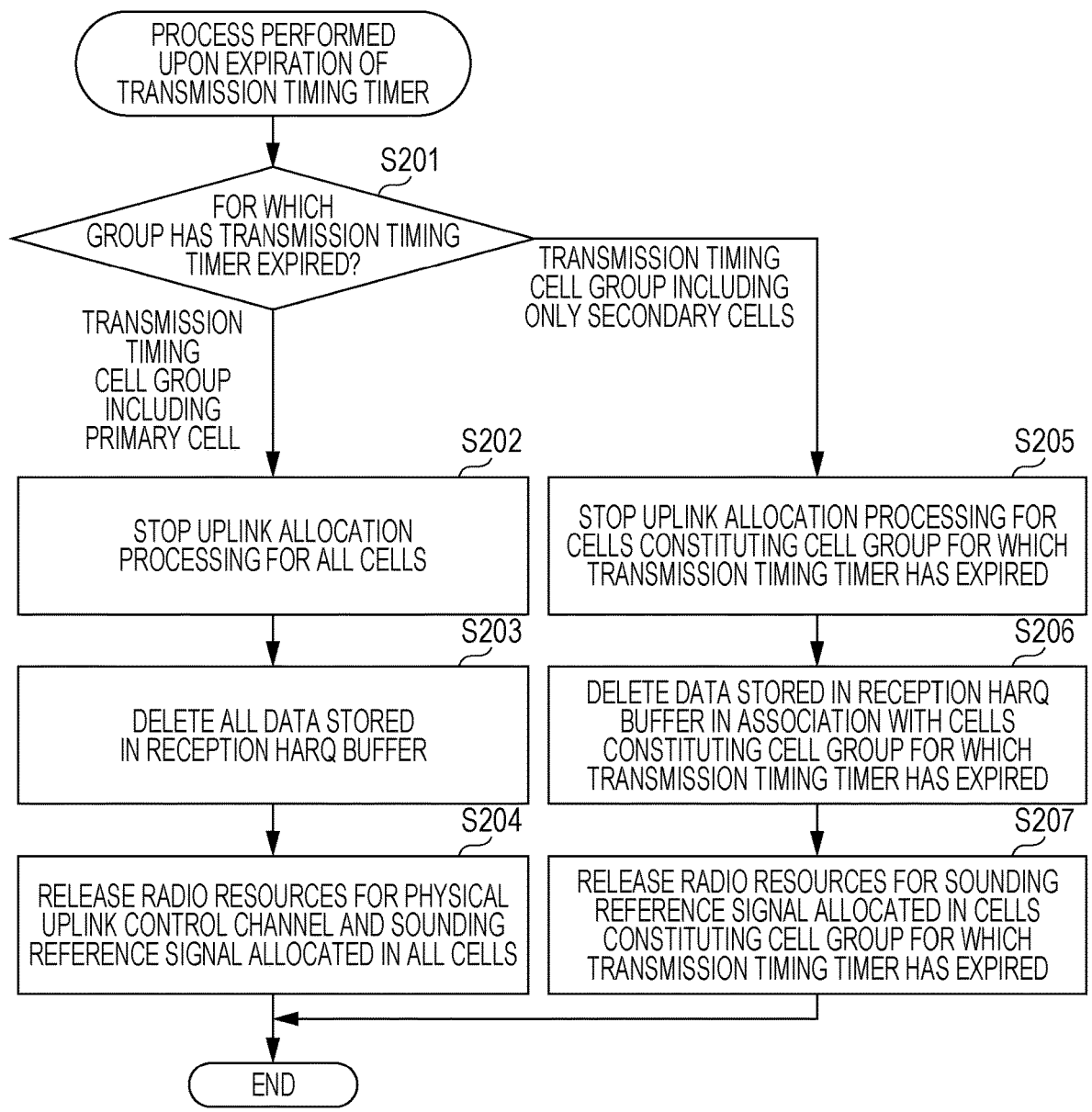
FIG. 5 is a flowchart illustrating an example of an operation performed by the base station apparatus when a transmission timing timer has expired.

FIG. 5 illustrates a flowchart of a process performed by the base station apparatus 3 in a case where a transmission timing timer has expired. In a case where a transmission timing timer has expired, the base station apparatus 3 determines for which transmission timing cell group the transmission timing timer has expired (step S201). If the transmission timing cell group for which the transmission timing timer has expired is a transmission timing cell group including the primary cell, the base station apparatus 3 stops a transmission timing timer for a transmission timing cell group constituted only by the secondary cells, and stops processing of allocating the physical uplink shared channel PUSCH for the mobile station apparatus 1-1 (step S202). Subsequently, the base station apparatus 3 deletes all data stored in the reception HARQ buffer (step S203). Then, the base station apparatus 3 releases radio resources for the physical uplink control channels PUCCHs that are allocated to the mobile station apparatus 1-1 and radio resources for the sounding reference signals that are allocated to all the cells (step S204).

Note that the mobile station apparatus 1-1 may be configured not to release radio resource for the physical uplink control channel PUCCH used for transmitting a response (Ack/Nack) to data among the physical uplink control channels PUCCHs allocated to the mobile station apparatus 1-1 by the base station apparatus 3. In this case, after uplink synchronization is re-established, the mobile station apparatus 1-1 can immediately return a response to downlink data to the base station apparatus 3.

If the transmission timing cell group for which the transmission timing timer has expired is a transmission timing cell group constituted only by the secondary cells, the base station apparatus 3 stops processing of allocating the physical uplink shared channel PUSCH for the cells included in the transmission timing cell group for which the transmission timing timer has expired (step S205). Then, the base station apparatus 3 deletes data stored in the reception HARQ buffer in association with the cells included in the transmission timing cell group for which the transmission timing timer has expired (step S206). The base station apparatus 3 releases radio resources for the sounding reference signals that are allocated to the cells included in the transmission timing cell group for which the transmission timing timer has expired (step S207).

With this configuration, in a case where the base station apparatus and the mobile station apparatus make notifications via cells belonging to a plurality of transmission timing cell groups, the base station apparatus notifies or stops notifying the mobile station apparatus of transmission timing information regarding each transmission timing cell group while taking into account the amount of data transmitted from the mobile station apparatus. In this way, the base station apparatus continues or stops individual transmission timing timers, thereby making corresponding transmission timings valid or invalid. This allows the base station apparatus to efficiently control transmissions performed by the mobile station apparatus.

The above embodiment has described an example of the operation in which uplink transmission processing is stopped in cells related to a cell for which a transmission timing timer has expired. However, in a case where a transmission timing timer has expired, not only uplink transmission processing but also downlink reception processing may be stopped.

Specifically, in a case where a transmission timing timer for a transmission timing cell group including the primary cell has expired, the mobile station apparatus 1-1 further stops downlink reception processing in all the secondary cells and deletes data stored in the reception HARQ buffer in association with all the secondary cells. In a case where a transmission timing timer for a transmission timing cell group constituted only by the secondary cells has expired, the mobile station apparatus 1-1 may stop downlink reception processing in the cells belonging to the transmission timing cell group for which the transmission timing timer has expired, and may delete data stored in the reception HARQ buffer in association with the cells belonging to the transmission timing cell group for which the transmission timing timer has expired.

This enables not only control of uplink transmission performed by the mobile station apparatus 1-1 but also efficient control of reception performed by the mobile station apparatus 1-1.

While one embodiment of this invention has been described in detail above with reference to the drawings, specific configurations are not limited to the above-described ones and various design changes or the like can be made within a scope that does not deviate from the gist of this invention.

For the convenience of explanation, the mobile station apparatus 1-1 and the base station apparatus 3 according to the embodiment have been described by using functional block diagrams. A program for implementing the functions of the individual units of the mobile station apparatus 1-1 and the base station apparatus 3 or some of these functions may be recorded on a computer-readable recording medium, the program recorded on the recording medium may be loaded into a computer system so as to be executed, and thereby the mobile station apparatus and the base station apparatus may be controlled. The "computer system" used herein includes an OS (Operating System) and hardware, such as peripheral devices.

The "computer-readable recording medium" indicates a portable medium, such as a flexible disk, a magneto-optical disk, a ROM (Read Only Memory), or a CD (Compact Disk)-ROM; or a storage device, such as a hard disk drive built in the computer system. Furthermore, the "computer-readable recording medium" includes a medium which dynamically holds a program for a short time, such as a communication line used for transmitting a program via a network such as the Internet or a communication line such as a telephone line, and a medium which holds a program for a certain period, such as a volatile memory in the computer system serving as a server or a client in that case. The above-described program may be used for implementing some of the above-described functions, and may be a program with which the above-described functions can be implemented in combination with a program which has already been recorded in the computer system.

The individual functional blocks used in the above-described embodiment may be typically implemented as an LSI, which is an integrated circuit. The individual functional blocks may be individually formed as chips, or some or all of them may be integrated into a chip. A method for integration may be a dedicated circuit or a general-purpose processor, as well as an LSI. In a case where the progress of semiconductor technologies produces an integration technology which replaces an LSI, an integrated circuit based on the technology can be used.

The embodiment of this invention has been described in detail above with reference to the drawings. Specific configurations are not limited to this embodiment, and design or the like within a scope that does not deviate from the gist of this invention is also included in the claims.

REFERENCE SIGNS LIST 1-1 to 1-3 mobile station apparatus, 3 base station apparatus, 5-1 and 5-2 repeater, 101 and 201 radio unit, 103 and 203 transmission processing unit, 115 and 215 reception processing unit, 107 and 207 transmission HARQ processing unit, 109 and 209 transmission HARQ storage unit, 119 and 219 reception HARQ processing unit, 121 and 221 reception HARQ storage unit, 123 and 223 control unit, 125 mobile station management unit, 225 base station management unit

The invention claimed is:

1. A mobile station apparatus comprising:
a memory and a processor in electrical communication with the memory, the processor executing instructions stored in the memory to:
configure a first timer related to a first group and a second timer related to a second group, wherein a first group of one or more cells uses a first uplink transmission timing, the one or more cells includes a primary cell and zero or more secondary cells, and a second group of one or more secondary cells uses a second uplink transmission timing,
in a case where the first timer of the first group has expired:
all transmission HARQ buffers in association with the one or more cells of the first group are flushed, the second timer is considered as expired, and
an uplink transmission on any cells except random access preamble transmission on the primary cell is stopped; and
in a case where the second timer of the second group has expired:
all transmission HARQ buffers in association with the one or more secondary cells of the second group are flushed, and
an uplink transmission on any cells in the second group except random access preamble transmission on the any cells in the second group is stopped.

2. A method of a mobile station apparatus comprising:
configuring a first timer related to a first group and a second timer related to a second group, wherein a first group of one or more cells uses a first uplink transmission timing, the one or more cells includes a primary cell and zero or more secondary cells, and a second group of one or more secondary cells uses a second uplink transmission timing,
in a case where the first timer of the first group has expired: all transmission HARQ buffers in association with the one or more cells of the first group are flushed, the second timer is considered as being expired, and an uplink transmission on any cells except random access preamble transmission on the primary cell is stopped; and
in a case where the second timer of the second group has expired: all transmission HARQ buffers in association with the one or more secondary cells of the second group are flushed, and an uplink transmission on any cells in the second group except random access preamble transmission on the any cells in the second group is stopped.

* * * * *